US012602588B2

US 12,602,588 B2

(12) United States Patent
Zhang et al.

(10) Patent No.: US 12,602,588 B2
(45) Date of Patent: Apr. 14, 2026

(54) NEURAL NETWORK MODEL OPTIMIZATION METHOD BASED ON ANNEALING PROCESS FOR STAINLESS STEEL ULTRA-THIN STRIP

(71) Applicant: TAIYUAN UNIVERSITY OF TECHNOLOGY, Taiyuan (CN)

(72) Inventors: Zhixiong Zhang, Taiyuan (CN); Yongwei Fu, Taiyuan (CN); Tao Wang, Taiyuan (CN); Xiaoyan Xiong, Taiyuan (CN); Zhongkai Ren, Taiyuan (CN); Yuanming Liu, Taiyuan (CN); Tianxiang Wang, Taiyuan (CN); Xi Liao, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 616 days.

(21) Appl. No.: 18/162,618

(22) Filed: Jan. 31, 2023

(65) Prior Publication Data

US 2023/0289607 A1     Sep. 14, 2023

Related U.S. Application Data

(63) Continuation of application No. PCT/CN2022/116856, filed on Sep. 2, 2022.

(30) Foreign Application Priority Data

Mar. 8, 2022     (CN) .......................... 202210220808.8

(51) Int. Cl.
*G06N 3/084*       (2023.01)
*G06N 3/063*       (2023.01)

(52) U.S. Cl.
CPC ............. *G06N 3/084* (2013.01); *G06N 3/063* (2013.01)

(58) Field of Classification Search
CPC ................................. G06N 3/084; G06N 3/09
See application file for complete search history.

(56) References Cited

FOREIGN PATENT DOCUMENTS

| CN | 113008440 A | 6/2021 |
|----|-------------|--------|
| CN | 113128670 A | 7/2021 |

OTHER PUBLICATIONS

Priddy, K. L., & Keller, P. E. (2005). Artificial Neural Networks: An introduction. SPIE. (Year: 2005).*
Haykin, S. S. (2009). Neural networks and learning machines. Prentice Hall/Pearson (Year: 2009).*
(Continued)

*Primary Examiner* — Schyler S Sanks

(57) ABSTRACT

Disclosed is a neural network model optimization method based on an annealing process for a stainless steel ultra-thin strip, which belongs to the technical field of data analysis. Aiming at the defects of a size effect caused by a difference of the stainless steel ultra-thin strip from a macroscopic size, a poor adaptability of a common stainless steel mechanical property prediction method and the like, and a good capability of a neural network for processing a complex nonlinear problem, the method comprises modeling various factors influencing annealing of the stainless steel ultra-thin strip by utilizing an artificial neural network, thus predicting and controlling a mechanical property and a microscopic structure after annealing.

10 Claims, 13 Drawing Sheets

(56)              References Cited

OTHER PUBLICATIONS

Lan, Meng-Fei, et al. "Effect of annealing after strip casting on microstructure, precipitates and texture in non-oriented silicon steel produced by twin-roll strip casting." Materials Characterization 142 (2018): 531-539. (Year: 2018).*

Janoåec, Marcel, et al. "Microstructure and mechanical properties of cold rolled, annealed HSLA strip steels." Archives of civil and mechanical engineering 7.2 (2007): 29-38. (Year: 2007).*

* cited by examiner

Input layer M        Hidden layer I        Output layer J

Data set
Yield strength

Data set
Tensile strength

Data set

Elongation after fracture

Data set
Yield strength

Data set

Tensile strength

Data set

Elongation after fracture

NEURAL NETWORK MODEL OPTIMIZATION METHOD BASED ON ANNEALING PROCESS FOR STAINLESS STEEL ULTRA-THIN STRIP

CROSS-REFERENCE TO RELATED APPLICATIONS

This application is a continuation of International Patent Application No. PCT/CN2022/116856 with a filing date of Sep. 2, 2022, designating the United States, now pending, and further claims priority to Chinese Patent Application No. 202210220808.5 with a filing date of Mar. 8, 2022. The content of the aforementioned applications, including any intervening amendments thereto, are incorporated herein by reference.

TECHNICAL FIELD

The present invention belongs to the field of data analysis technologies, and particularly relates to a neural network model optimization method based on an annealing process for a stainless steel ultra-thin strip.

BACKGROUND OF THE PRESENT INVENTION

Stainless steel refers to steel resistant to weak corrosive media, such as air, steam and water, and chemical corrosive media, such as acid, alkali and salt. The stainless steel has good corrosion resistance, comprehensive performance and process performance. With the wide application of precision ultra-thin stainless steel materials, such as a coil spring, a stamping member, a mobile phone screen mask, a glasses frame, an ear hoop, a mobile phone vibrator and a precision robot, a demand on the comprehensive performance of the stainless steel is increasingly strict in the market. Therefore, a yield strength, a tensile strength, an elongation and a hardness of materials are sure to be predicted according to accumulated annealing process parameters during formulation of an annealing process for a stainless steel ultra-thin strip. Researchers have found that, with the reduction of a size of a workpiece, a stress-strain relationship, a formability, a friction coefficient and other parameters of metal materials show significantly different characteristics from those of a workpiece of a macroscopic size, which is usually called a size effect. When a thickness of an ultra-thin strip sample reaches an order of several microns to tens of microns, there will be only one layer of crystal grains in a thickness direction of the workpiece after annealing, which is namely a single-layer crystal. In addition, a grain size and a sample thickness of metal materials both affect a dislocation movement and the evolution of texture orientation, so that the yield strength and the tensile strength of materials show different performances from those of materials of the macroscopic size. In a process of studying the size effect of metal materials, it was found that a strength showed two completely opposite trends with the reduction of grain size and sample size, which means that the smaller the grain size and the sample size are, the weaker the strength is, and the smaller the grain size and the sample size are, the stronger the strength is. When the sample size and the grain size are in an order of iim, then the smaller the grain size and the sample size are, the weaker the strength is; while when the sample is a single crystal or the sample size is in an order of nm, then the smaller the grain size and the sample size are, the stronger the strength is. At present, related mechanisms are not clear enough in the study on the size effect, so that the size effect still needs to be further studied.

At present, a continuous annealing process is mainly used for annealing steel in a stainless steel strip, and a process flow is as follows: feeding and receiving procedures→cloth clamping device→looper device→front cooling water jacket→Muffle tube annealing furnace section→rear cooling water jacket→winding and unloading, which is suitable for mass production. Therefore, it is necessary to select an appropriate annealing process according to customer's requirements before production. There are many factors affecting heat treatment, such as a stainless steel trademark, a chemical composition of stainless steel, a thickness of strip steel, a degree of cold deformation, an original grain size, an annealing temperature, a heat preservation time, an annealing atmosphere, a heating speed and a cooling speed, with complex influencing relationships. The control of mechanical performances after annealing is mainly determined by an empirical formula, but this method lacks an adaptability to changes of different influencing factors. However, if the study is performed by experiments, it will take a lot of times of experiments, consume a lot of manpower, material resources and financial resources, and cannot adapt to intelligent control.

Artificial intelligence refers to the processing and utilization of information by simulating some intelligent mechanisms of human beings, some natural phenomena or intelligent behaviors of organisms. This kind of algorithm is intuitive and rich in natural mechanisms when constructed. In the field of artificial intelligence, there are many problems for which optimal solutions or quasi-optimal solutions need to be found in a complex and huge search space. An intelligent optimization algorithm is an algorithm produced in this background and proved to be particularly effective by practice. Traditional intelligent optimization algorithms comprise an evolutionary algorithm, a particle swarm optimization, a tabu algorithm, simulated annealing, an ant colony algorithm, a genetic algorithm, an artificial neural network technology and the like. These algorithms are all widely applied in banking, machinery, mining, social science and other industries and disciplines.

By simulating a brain of human beings, a neural network is formed by connecting multiple neurons, which can flexibly deal with complex nonlinear problems among input, storage and output. The neural network is characterized by a strong adaptive learning capability, accurate prediction and good robustness, and can better realize information prediction and control. An excellent nonlinear approximation performance of the neural network makes the neural network perform well in many fields, such as pattern classification, clustering, regression and fitting, and optimization calculation. In recent years, the neural network has been applied to solve an optimization problem of nonlinear process parameters during steel rolling and annealing.

SUMMARY OF PRESENT INVENTION

Aiming at an optimization problem of nonlinear process parameters in an annealing process of a stainless steel ultra-thin strip, the present invention provides a neural network model optimization method based on an annealing process for a stainless steel ultra-thin strip.

The present invention is intended to model annealing process parameters by an artificial neural network technology—an important component of artificial intelligence aiming at a nonlinearity and a complexity of annealing of the stainless steel ultra-thin strip, which has a strong adaptive learning capability, accurate prediction and good robustness, and can better realize information prediction and control.

In order to achieve the above objective, the following technical solution is used in the present invention.

A neural network model optimization method based on an annealing process for a stainless steel ultra-thin strip is provided, wherein an error back propagation algorithm is employed to train a single hidden layer neural network, comprising:

> step 1: designing a network model, and determining a number of layers of the network, and a number of nodes of an input layer, a number of nodes of an output layer and a number of nodes of a hidden layer;
>
> step 2: selecting a transfer function, a training method and training parameters;
>
> step 3: selecting sample data according to the step 2, dividing the sample data into a training set and a testing set, and performing data preprocessing;
>
> step 4: setting and initializing parameters of the neural network;
>
> step 5: adjusting forward propagation of a working signal of the neural network;
>
> step 6: adjusting back propagation of an error signal of the neural network;
>
> step 7: calculating an error value matrix and a Jacobian matrix;
>
> step 8: updating a weight and a threshold of the neural network; and
>
> step 9: performing error calculation and neural network testing.

The error back propagation algorithm is used for learning; a learning process of the neural network is to adjust a weight between neurons and a threshold of each functional neuron according to training data; in the neural network (BP network), the working signal is forwardly propagated layer by layer through the hidden layer from the input layer, and when the weight and the threshold of the network are trained, the error signal is reversely propagated, and a connection weight and a connection threshold of the network are forwardly corrected layer by layer through a middle layer from the output layer; and with the deepening of leaning, a final error will be smaller and smaller.

Further, a multi-layer network with one hidden layer is used. The multi-layer neural network with the single hidden layer is used, which makes the network have a better capability to deal with a nonlinear problem; the multi-layer neural network comprises the input layer, the output layer and the hidden layer, all the layers are connected with each other, and neurons of the same layer are not connected with each other, wherein neurons of the input layer receive an external input, neurons of the hidden layer and the output layer process a signal, and finally neurons of the output layer output the signal; and the multi-layer network design enables the network to mine more information from input sample data, thus finishing a more complex task.

Further, the selecting the sample data according to the step 2, dividing the sample data into the training set and the testing set, and performing the data preprocessing in the step 3, further comprises the following steps of:

> step 3.1: dividing the sample data into the training set and the testing set; and
>
> step 3.2: normalizing the samples in the training set and the testing set.

Further, a specific method for the normalizing the samples of the training set and the testing set in the step 3.2, comprises: mapping data to [0, 1] or [−1, 1] by using a mapminmax function, and recording an input in a data set as x and an output in the data set as o;

> that is: normalizing the samples to [0, 1] by a formula $u_M(1)=(x-x_{min})/(x_{max}-x_{min})$; and normalizing the samples to [−1, 1] by a formula $u_M(1)=2*(x-x_{min})/(x_{max}-x_{min})-1$, wherein x represents an input, which is generally a sample data value, and $u_M(1)$ represents an initial input value of the network; and
>
> similarly, normalizing the output o to obtain an expected output d(n) of the network, wherein $x_{max}$ represents a maximum input value, and $x_{min}$ represents a minimum input value.

Further, a specific method for the setting and initializing the parameters of the neural network in the step 4, comprises: employing a three-layer neural network, setting a transfer function of the hidden layer as a Sigmod function, and setting a transfer function of the output layer as a linear function; and representing an input and an output of each layer with u and v, wherein:

> an input of the input layer is $$u_M^m(n)$$

> and an output of the input layer is $$v_M^m(n);$$

> an input of the hidden layer is $$u_I^i(n)$$

> and an output of the hidden layer is $$v_I^i(n);$$

> an input of the output layer is $$u_J^j(n)$$

> and an output of the output layer is $$v_J^j(n);$$

> a number of neurons of the input layer is M and an $m^{th}$ neuron of the input layer is recorded as $x_m$;
>
> a number of neurons of the hidden layer is I and an $i^{th}$ neuron of the hidden layer is recorded as $k_i$;
>
> a number of neurons of the output layer is J and a $j^{th}$ neuron of the output layer is recorded as $y_j$;
>
> a connection weight from $x_m$ to $k_i$ is $$\omega_{mi}^1$$

and a connection threshold is $$b_i^1;$$

a connection weight from $k_i$ to $y_j$ is $$\omega_{ij}^2$$

and a connection threshold is $$b_j^2;$$

an input signal of the network is denoted as $$u_M(n) = \left[u_M^1, u_M^2, \ldots, u_M^M\right]';$$

an actual output of the network is denoted as $$Y(n) = \left[v_J^1, v_J^2, \ldots, v_J^J\right];$$

an expected output of the network is denoted as $$d(n) = [d_1, d_2, \ldots, d_J];$$

wherein n represents a number of iterations, and d represents an output value of the sample data;

an error of the $j^{th}$ neuron of the output layer in an $n^{th}$ iteration is denoted as $e_j(n) = d_j(n) - Y_j(n)$, and a total error is denoted as $$E(n) = \frac{1}{2} \sum_{j=1}^{J} e_j^2(n),$$

wherein e represents the error;

a weight matrix $W^1$ between the neuron of the input layer and the neuron of the hidden layer is:

$$W^1(n) = \begin{bmatrix} \omega_{11}^1 & \omega_{12}^1 & \cdots & \omega_{1i}^1 & \cdots & \omega_{1I}^1 \\ \omega_{21}^1 & \omega_{22}^1 & \cdots & \omega_{2i}^1 & \cdots & \omega_{2I}^1 \\ \vdots & \vdots & & \vdots & & \vdots \\ \omega_{m1}^1 & \omega_{m2}^1 & \cdots & \omega_{mi}^1 & \cdots & \omega_{mI}^1 \\ \vdots & \vdots & & \vdots & & \vdots \\ \omega_{M1}^1 & \omega_{M2}^1 & \cdots & \omega_{Mi}^1 & \cdots & \omega_{MI}^1 \end{bmatrix};$$

a weight matrix $W^2$ between the neuron of the hidden layer and the neuron of the output layer is:

$$W^2(n) = \begin{bmatrix} \omega_{11}^2 & \omega_{12}^2 & \cdots & \omega_{1j}^2 & \cdots & \omega_{1J}^2 \\ \omega_{21}^2 & \omega_{22}^2 & \cdots & \omega_{2j}^2 & \cdots & \omega_{2J}^2 \\ \vdots & \vdots & & \vdots & & \vdots \\ \omega_{i1}^2 & \omega_{i2}^2 & \cdots & \omega_{ij}^2 & \cdots & \omega_{iJ}^2 \\ \vdots & \vdots & & \vdots & & \vdots \\ \omega_{I1}^2 & \omega_{I2}^2 & \cdots & \omega_{Ij}^2 & \cdots & \omega_{IJ}^2 \end{bmatrix};$$

a threshold $b^1(n)$ of the neuron of the hidden layer is:

$$b^1(n) = \left[b_1^1, b_2^1, \ldots, b_i^1\right]';$$

a threshold $b^2(n)$ of the neuron of the output layer is:

$$b^2(n) = \left[b_1^2, b_2^2, \ldots, b_j^2\right]'.$$

Further, a specific method for the forward propagation of the working signal of the neural network in the step 5, comprises:

setting the output of the input layer to be equal to an input signal of the network:

$$v_M^m(n) = u_M^m(n);$$

setting the input of the $i^{th}$ neuron of the hidden layer to be equal to a weighted sum of the output of the input layer:

$$u_I^i(n) = \sum_{m=1}^{M} \omega_{mi}^1(n) v_M^m(n) - b_i^1(n);$$

and setting the output of the $i^{th}$ neuron of the hidden layer to be equal to the transfer function of the hidden layer:

$$v_I^i(n) = f\!\left(u_I^i(n)\right),$$

wherein $f(\bullet)$ is the transfer function of the hidden layer;

setting the input of the $j^{th}$ neuron of the output layer to be equal to a weighted sum of the output of the hidden layer:

$$u_J^j(n) = \sum_{i=1}^{I} \omega_{ij}^2(n) v_I^i(n) - b_j^2(n);$$

and setting the output of the $j^{th}$ neuron of the output layer to be equal to the transfer function of the output layer:

$$v_J^j(n) = g\!\left(u_J^j(n)\right),$$

7 8 wherein g(•) is the transfer function of the output layer; so, an error of the $j^{th}$ neuron of the output layer is equal to:

$$ej(n) = d_j(n) - v_J^j(n);$$

and
a total error of the network is denoted as:

$$E(n) = \frac{1}{2}\sum_{j=1}^{J} e_j^2(n) =$$

$$\frac{1}{2}\sum_{j=1}^{J}\left\{d_j(n) - g\left[\sum_{i=1}^{I}\omega_{ij}^2(n)f\left(\sum_{m=1}^{M}\omega_{mi}^1(n)e_M^m(n) - b_i^1(n)\right) - b_j^2(n)\right]\right\}^2$$

Further, a specific method for the back propagation of the error signal of the neural network in the step 6, comprises:
step 6.1: in a weight and threshold adjustment stage, reversely adjusting layer by layer along the neural network, and adjusting the weight $$\omega_{ij}^2$$

and the threshold $$b_j^2$$

between the hidden layer and the output layer first;
a partial derivative of the total error to the weight $$\omega_{ij}^2$$

between the hidden layer and the output layer being:

$$\frac{\partial E(n)}{\partial \omega_{ij}^2(n)} = \frac{\partial E(n)}{\partial e_j(n)} \cdot \frac{\partial e_j(n)}{\partial v_J^j(n)} \cdot \frac{\partial v_J^j(n)}{\partial u_J^j(n)} \cdot \frac{\partial u_J^j(n)}{\partial \omega_{ij}^2(n)} =$$

$$e_j(n)\cdot(-1)\cdot g'\left(u_J^j(n)\right)\cdot v_I^i(n) = -e_j(n)g'\left(u_J^j(n)\right)v_I^i(n),$$

a partial derivative of the total error to the threshold $$b_j^2$$

between the hidden layer and the output layer being:

$$\frac{\partial E(n)}{\partial b_j^2(n)} = \frac{\partial E(n)}{\partial e_j(n)} \cdot \frac{\partial e_j(n)}{\partial v_J^j(n)} \cdot \frac{\partial v_J^j(n)}{\partial u_J^j(n)} \cdot \frac{\partial u_J^j(n)}{\partial b_j^2(n)} =$$

$$e_j(n)\cdot(-1)\cdot g'\left(u_J^j(n)\right)\cdot(-1) = e_j(n)g'\left(u_J^j(n)\right),$$

a local gradient being:

$$\delta_J^j = -\frac{\partial E(n)}{\partial u_J^j(n)} = -\frac{\partial E(n)}{\partial e_J(n)} \cdot \frac{\partial e_j(n)}{\partial v_J^j(n)} \cdot \frac{\partial v_J^j(n)}{\partial u_J^j(n)} = e_j(n)g'\left(u_J^j(n)\right),$$

wherein g'(•) represents a derivative of the transfer function g(•) of the output layer; and
step 6.2: forwardly propagating the error signal, and adjusting the weight $$\omega_{mi}^1$$

and the threshold $$b_i^1$$

between the input layer and the hidden layer;
a partial derivative of the total error to the weight $$\omega_{mi}^1$$

between the input layer and the hidden layer being:

$$\frac{\partial E(n)}{\partial \omega_{mi}^1} = \frac{\partial E(n)}{\partial e_j(n)} \cdot \frac{\partial e_j(n)}{\partial v_J^j(n)} \cdot \frac{\partial v_J^j(n)}{\partial u_J^j(n)} \cdot \frac{\partial u_J^j(n)}{\partial v_I^i(n)} \cdot \frac{\partial v_I^i(n)}{\partial u_I^i(n)} \cdot \frac{\partial u_I^i(n)}{\partial \omega_{mi}^1} =$$

$$-\sum_{j=1}^{J}\left(\delta_J^j \cdot \omega_{ij}^2(n)\right) \cdot f'\left(u_I^i(n)\right) \cdot v_M^m(n).$$

a partial derivative of the total error to the threshold $$b_i^1$$

between the input layer and the hidden layer being:

$$\frac{\partial E(n)}{\partial b_i^1(n)} = \frac{\partial E(n)}{\partial e_j(n)} \cdot \frac{\partial e_j(n)}{\partial v_J^j(n)} \cdot \frac{\partial v_J^j(n)}{\partial u_J^j(n)} \cdot \frac{\partial u_J^j(n)}{\partial v_I^i(n)} \cdot \frac{\partial v_I^i(n)}{\partial u_I^i(n)} \cdot \frac{\partial v_I^i(n)}{\partial b_i^1(n)} =$$

$$-\sum_{j=1}^{J}\left(\delta_J^j \cdot \omega_{ij}^2(n)\right) \cdot f'\left(u_I^i(n)\right) \cdot(-1),$$

a local gradient being:

$$\delta_I^i = -\frac{\partial E(n)}{\partial u_I^i(n)} =$$

$$-\frac{\partial E(n)}{\partial v_I^i(n)} \cdot \frac{\partial v_I^i(n)}{\partial u_I^i(n)} = -\frac{\partial E(n)}{\partial v_I^i(n)} \cdot f'\left(u_I^i(n)\right) = \sum_{j=1}^{J}\left(\delta_J^j \cdot \omega_{ij}^2(n)\right) \cdot f'\left(u_I^i(n)\right),$$

wherein f'(•) represents a derivative of the transfer function f(•) of the input layer; and the local gradient of the neuron is equal to a product of the error signal of the neuron and the derivative of the transfer function;

so, the weight and the threshold are denoted with the local gradient as:

$$\frac{\partial E(n)}{\partial \omega_{ij}^2(n)} = -\delta_J^j v_I^j(n);$$

$$\frac{\partial E(n)}{\partial b_j^2(n)} = \delta_J^j;$$

$$\frac{\partial E(n)}{\partial \omega_{mi}^1(n)} = -\delta_J^j v_M^{jm}(n);$$

$$\frac{\partial E(n)}{\partial b_i^1(n)} = \delta_J^j.$$

Further, a specific method for the calculating the error value matrix and the Jacobian matrix in the step 7, comprises:

denoting an error value matrix of Q samples as:

$$e(n) = \begin{bmatrix} e_{11}(n) & e_{12}(n) & \cdots & e_{1q}(n) & \cdots & e_{1Q}(n) \\ e_{21}(n) & e_{22}(n) & \cdots & e_{2q}(n) & \cdots & e_{2Q}(n) \\ \vdots & \vdots & & \vdots & & \vdots \\ e_{j1}(n) & e_{j2}(n) & \cdots & e_{jq}(n) & \cdots & e_{jQ}(n) \\ \vdots & \vdots & & \vdots & & \vdots \\ e_{J1}(n) & e_{J2}(n) & \cdots & e_{Jq}(n) & \cdots & e_{JQ}(n) \end{bmatrix};$$

denoting an element of the Jacobian matrix as:

$$J_{jq}(n) = \begin{bmatrix} \frac{\partial e_{jq}(n)}{\partial \omega_{11}^2(n)} & \frac{\partial e_{jq}(n)}{\partial \omega_{12}^2(n)} & \cdots & \frac{\partial e_{jq}(n)}{\partial \omega_{1j}^2(n)} & \cdots & \frac{\partial e_{jq}(n)}{\partial \omega_{1J}^2(n)} \\ \frac{\partial e_{jq}(n)}{\partial \omega_{21}^2(n)} & \frac{\partial e_{jq}(n)}{\partial \omega_{22}^2(n)} & \cdots & \frac{\partial e_{jq}(n)}{\partial \omega_{2j}^2(n)} & \cdots & \frac{\partial e_{jq}(n)}{\partial \omega_{2J}^2(n)} \\ \vdots & \vdots & & \vdots & & \vdots \\ \frac{\partial e_{jq}(n)}{\partial \omega_{i1}^2(n)} & \frac{\partial e_{jq}(n)}{\partial \omega_{i2}^2(n)} & \cdots & \frac{\partial e_{jq}(n)}{\partial \omega_{ij}^2(n)} & \cdots & \frac{\partial e_{jq}(n)}{\partial \omega_{iJ}^2(n)} \\ \vdots & \vdots & & \vdots & & \vdots \\ \frac{\partial e_{jq}(n)}{\partial \omega_{I1}^2(n)} & \frac{\partial e_{jq}(n)}{\partial \omega_{I2}^2(n)} & \cdots & \frac{\partial e_{jq}(n)}{\partial \omega_{Ij}^2(n)} & \cdots & \frac{\partial e_{jq}(n)}{\partial \omega_{IJ}^2(n)} \end{bmatrix};$$

denoting a structure of the Jacobian matrix as:

$$J(n) = \begin{bmatrix} J_{11}(n) & J_{12}(n) & \cdots & J_{1q}(n) & \cdots & J_{1Q}(n) \\ J_{21}(n) & J_{22}(n) & \cdots & J_{2q}(n) & \cdots & J_{2Q}(n) \\ \vdots & \vdots & & \vdots & & \vdots \\ J_{j1}(n) & J_{j2}(n) & \cdots & J_{jq}(n) & \cdots & J_{jQ}(n) \\ \vdots & \vdots & & \vdots & & \vdots \\ J_{J1}(n) & J_{J2}(n) & \cdots & J_{Jq}(n) & \cdots & J_{JQ}(n) \end{bmatrix};$$

similarly, obtaining the Jacobian matrix of the weights of the input layer and the hidden layer;

H being a Hessian matrix of an error performance function, which contains second derivative information of the error function; when the error performance function has a form of square sum error, the Hessian matrix being approximately denoted as $H=J^T J$; and a gradient being denoted as $g==J^T e$, wherein J is a Jacobian matrix of a first derivative of the error performance function to the weight of the network.

Further, a specific method for the updating the weight and the threshold of the neural network in the step 8, comprises:

adjustment amount $\Delta \omega$=learning rate $\eta$·local gradient $\delta$·output signal of previous layer 17;

due to uncertain reversibility of $J^T J$, a unit matrix U is introduced to obtain $H=J^T J+\mu U$, wherein $\mu$ is a damping factor;

according to a formula $\omega(n+1)=\omega(n)-[J^T J+\mu U]^{-1}J^T e$, a weight and a threshold of a LM algorithm are corrected; and when $\mu$=0, the LM algorithm is degenerated into a Newton Method;

a weight update formula is denoted as:

$$\omega_{ij}^2(n+1) = \omega_{ij}^2(n) - \left[J^2(n)^T J^2(n) + \mu U\right]^{-1} \eta J^2(n)^T e_j(n) v_I^j(n)$$

$$\omega_{mi}^2(n+1) = \omega_{mi}^1(n) - \left[J^2(n)^T J^2(n) + \mu U\right]^{-1} \eta J^1(n)^T \sum_{j=1}^J \left(J^2(n) e_j(n)\right)$$

$$\omega_{ij}^2(n)\big) v_I^j(n) v_M^m(n);$$

and a threshold update formula is denoted as:

$$b_j^2(n+1) = b_j^2(n) - \left[J^2(n)^T J^2(n) + \mu U\right]^{-1} \eta J^2(n)^T e_j(n) v_I^j(n)$$

$$b_i^1(n+1) = b_i^1(n) - \left[J^1(n)^T J^1(n) + \mu U\right]^{-1} \eta J^1(n)^T \sum_{j=1}^j \left(J^2(n) e_j(n)\right)$$

$$\omega_{ij}^2(n)\big) v_I^j(n) v_M^m(n).$$

The LM algorithm based on numerical optimization optimizes the neural network model; the LM algorithm is a most widely applied nonlinear least squares algorithm, which is a combination of a gradient descent method and a Newton method, and has the advantages of the two methods at the same time; and the LM algorithm is insensitive to parametric problems, and can effectively deal with a redundant parameter problem, thus greatly reducing a chance of making a performance function fall into a local minimum. The damping factor is introduced in the LM algorithm; when the damping factor is 0, the LM algorithm is degenerated to the Newton method; and when the damping factor is very large, the LM algorithm is equivalent to the gradient descent method with a small step size.

Further the step 9 comprises: calculating an error value, judging whether a MSE error formula meets an accuracy requirement, when the MSE error formula meets the accuracy requirement, stopping the iteration; when the MSE error formula does not meet the accuracy requirement, continuing the iteration; after finishing training of the neural network, testing a testing set; and obtaining an actual predicted value by inversely normalizing an output result of the network.

Compared with the prior art, the present invention has the following advantages.

1. According to the present invention, the BP neural network prediction model is designed, and the neural network model is optimized from the number of neurons of the hidden layer, the training function and other aspects, thus improving prediction accuracy of mechanical performances of stainless steel after annealing.

2. Mechanical performances of 316L stainless steel after annealing are evaluated by a comprehensive quantitative evaluation method of heat processing quality, optimum process parameters optimized by the BP neural network are compared with currently used annealing process parameters of a certain enterprise, and the optimized process parameters can significantly improve the mechanical performances of the stainless steel.

3. After optimization, the BP neural network has a good prediction capability and a high prediction accuracy, has a good application effect in a heat treatment production line, and is conductive to obtaining optimum process parameters of the heat treatment by fewer experiments, thus greatly saving manpower, material resources and financial resources.

DESCRIPTION OF THE DRAWINGS

FIG. 3A shows a graph of a true value, a simulated value and an absolute error of a group of data of a training set for yield strength;

FIG. 3B shows a graph of a true value, a simulated value and an absolute error of a group of data of a training set for tensile strength; FIG. 3C shows a graph of a true value, a simulated value and an absolute error of a group of data of a training set for elongation after fracture;

FIG. 3D shows a true value, a simulated value and an absolute error of a group of data of a testing set for yield strength; FIG. 3E shows a true value, a simulated value and an absolute error of a group of data of a testing set for tensile strength; and FIG. 3F shows a true value, a simulated value and an absolute error of a group of data of a testing set for elongation after fracture;

FIG. 4A shows a regression curve graph of the training set; FIG. 4B shows a regression curve graph of the validation set; FIG. 4C shows a regression curve graph of the testing set; and FIG. 4D shows a regression curve graph of the training set, the validation set and the testing set together.

DETAILED DESCRIPTION OF PREFERRED EMBODIMENTS

Embodiment 1

Figure 1:
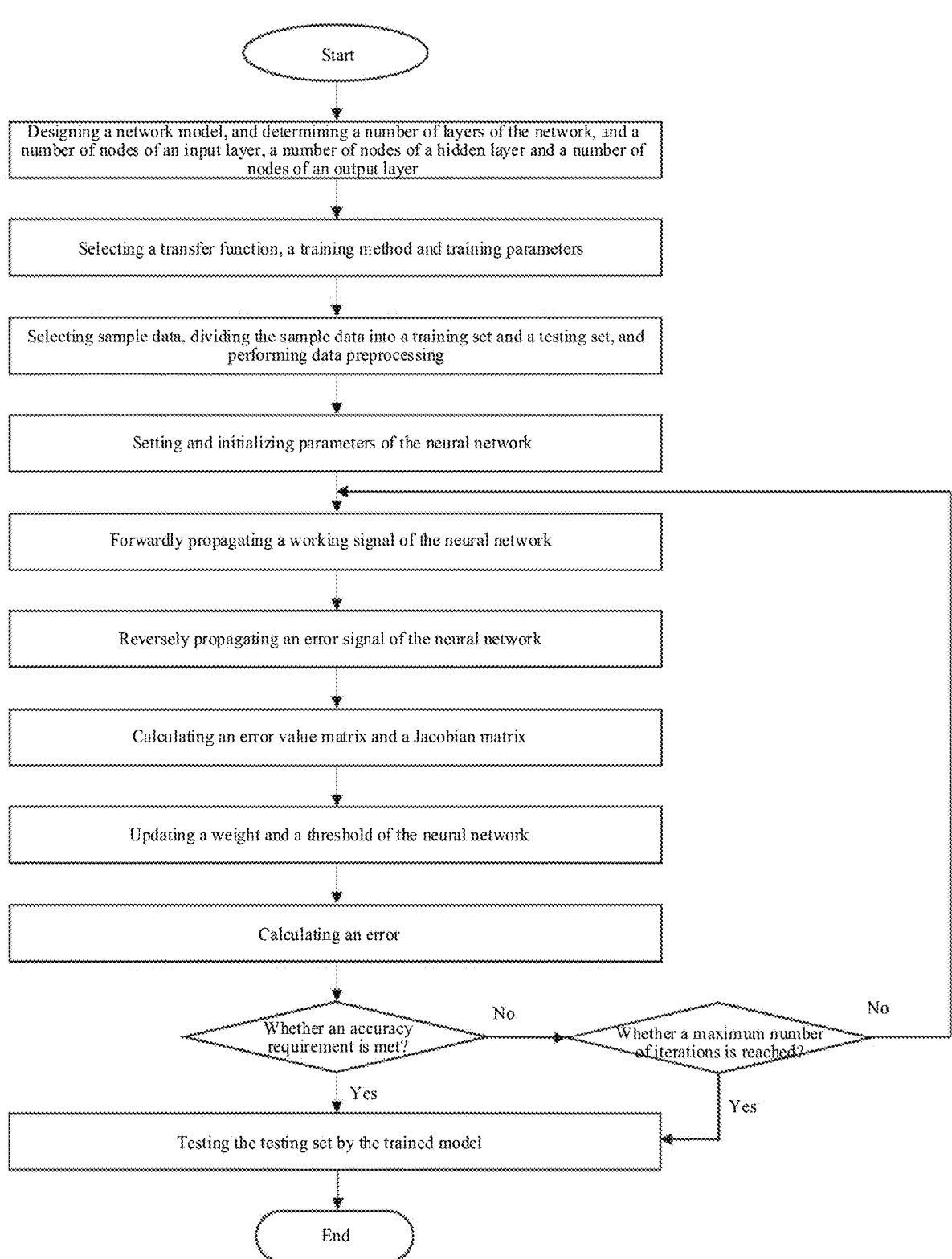
FIG. 1 is a specific work flow chart of the present invention.

A neural network model optimization method based on an annealing process for a stainless steel ultra-thin strip comprises the following steps.

In step 1, a network model is designed, and a number of layers of the network, and a number of nodes of an input layer, a number of nodes of a hidden layer and a number of nodes of an output layer are determined.

An annealing experiment is performed on the stainless steel ultra-thin strip, independent variables comprise a heat treatment temperature, a heat preservation time and a sampling direction, and dependent variables comprise a yield strength, a tensile strength, an elongation after fracture and a hardness.

The number of nodes of the input layer depends on a number of dimensions of an input vector. The heat treatment temperature, the heat preservation time and the sampling direction are selected as inputs of the neural network, and the number of nodes of the input layer is 3.

The number of nodes of the output layer is determined according to an abstract model, and the yield strength, the tensile strength, the elongation after fracture and the hardness are selected as outputs of the neural network, so that the number of nodes of the output layer is 3.

The multi-layer neural network may contain one or more hidden layers. The more the hidden layers are provided, the stronger the data expression capability is. However, a training cost can be increased and over-fitting is easily caused at the same time.

At present, there is no ideal analytical formula that can be used to determine a reasonable number of nodes of the hidden layer, which is usually adjusted by trial and error in practice. Generally, the determination of the number of nodes has the following two conventions.

1. If a change of the sample function to be approximated is very wide in range and drastic, the number of nodes of the hidden layer is expected to be larger.

2. If an accuracy requirement is very high, the number of nodes of the hidden layer should be larger.

Meanwhile, an empirical formula may be used to give an estimated value.

$$\sum_{i=0}^{n} C_M^i > k, \qquad\qquad 1.$$

wherein k is a number of samples, M is the number of nodes of the hidden layer, and n is the number of nodes of the input layer. If i>M, it is specified that $$C_M^i = 0.$$

2. $M=\sqrt{m+n}+a$, wherein m and n are respectively the number of nodes of the output layer and the number of nodes of the input layer, and a is an integer between [0, 10].

3. $M=\log_2 n$, wherein n is the number of nodes of the input layer.

4. Kolmogorov theorem: a continuous function is given, and the function may be accurately realized by a three-layer feedforward neural network. The number of nodes of the input layer and the number of nodes of the output layer are respectively set as n and m, so the number of nodes of the hidden layer is M=2n+1.

In step 2, a transfer function, a training method and training parameters are selected.

For the selection of the transfer function, generally, a Sigmod function is used in the hidden layer, and a linear function is used in the output layer.

For a general curve fitting problem, when a weight of the network is less than 100, an optimum training algorithm for the neural network is a LM algorithm.

Training parameters needed by a BP network comprise an initial weight, an initial threshold, a learning rate, a momentum factor, a maximum number of iterations and an error tolerance.

An excessively large or small initial value may affect performances, the initial weight is usually defined as a small non-zero random number, and an empirical value is between $(-2.4/F, 2.4/F$ or $(-3/, 3/)$, wherein F is a number of neurons connected with a weight input terminal.

A value of the learning rate is between [0, 1], and is 0.01 in the embodiment.

The maximum number of iterations may be 1000 to 10000.

The error tolerance may be $10^{-5}$.

In step 3: sample data are selected, divided into a training set and a testing set, and subjected to data preprocessing.

The sample data are divided into the training set and the testing set.

Samples in the training set and the testing set are normalized.

In order to ensure a training effect, the samples must be normalized, and the data may be mapped to [0, 1] or [−1, 1] through normalization.

The samples may be normalized by a mapminmax function, and an algorithm principle is as follows.

1. $y=(x-x_{min})/(x_{max}-x_{min})$, the samples are normalized to [0, 1].

2. $y=2*(x-x_{min})/(x_{max}-x_{min})-1$, the samples are normalized to [−1, 1].

In step 4: parameters of the neural network are set and initialized.

Figure 2:
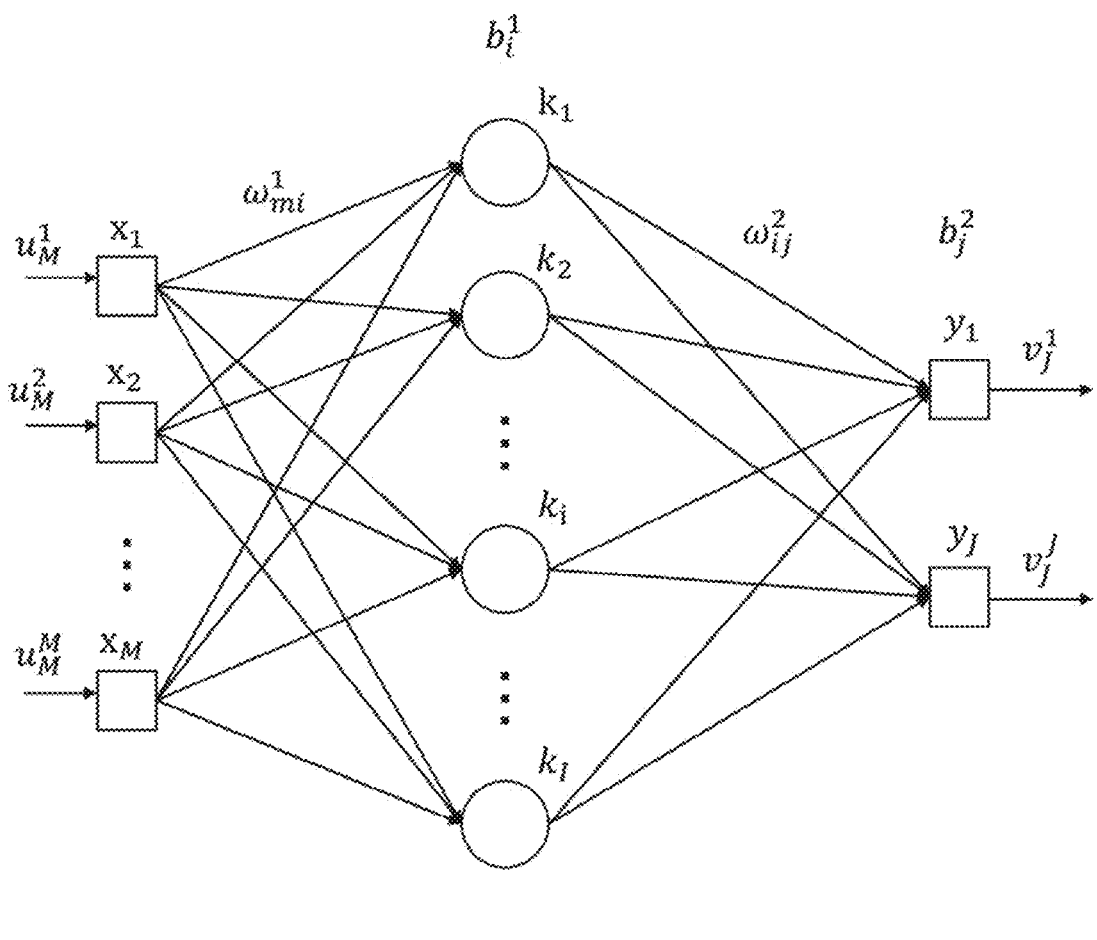
FIG. 2 is a schematic diagram of a three-layer BP neural network constructed by the present invention.
Figure 3A:
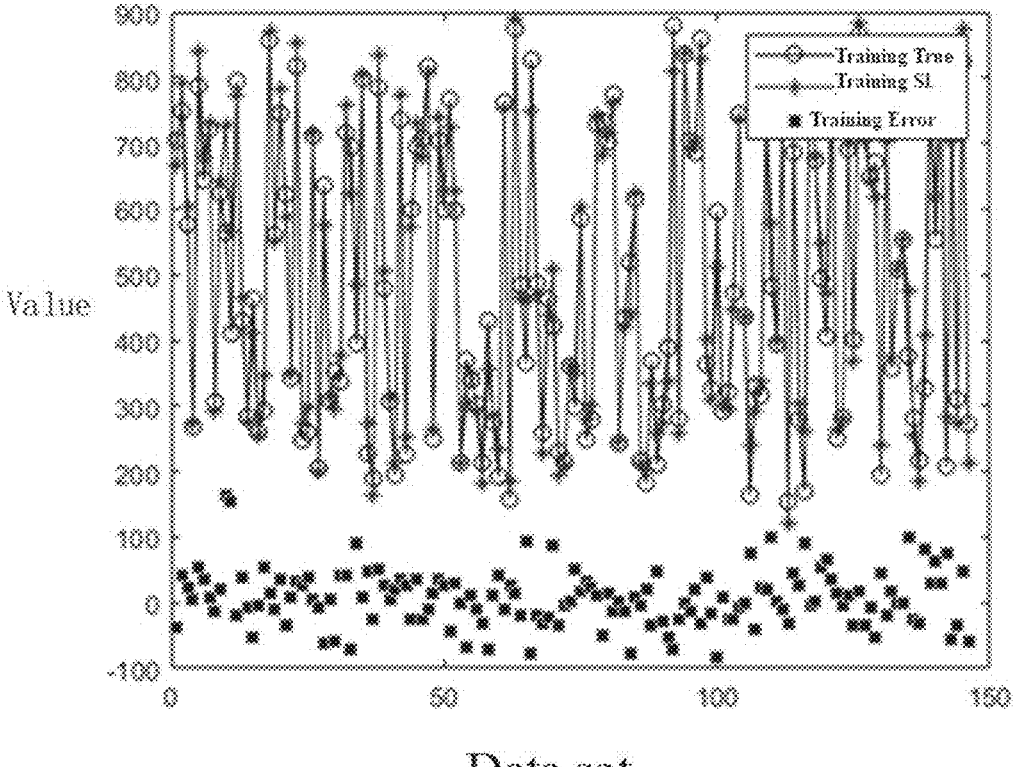
FIGS. 3A-3F show graphs of a true value, a simulated value and an absolute error of each group of data of a training set and a testing set.
Figure 3B:
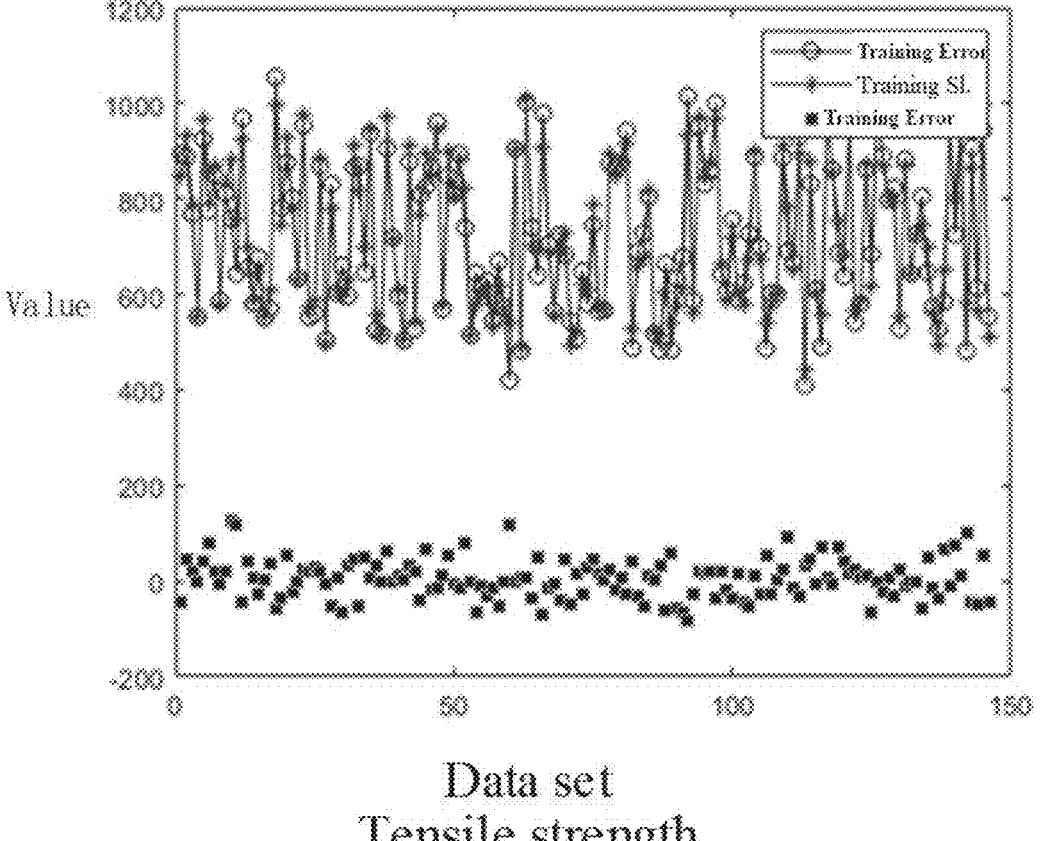
Figure 3C:
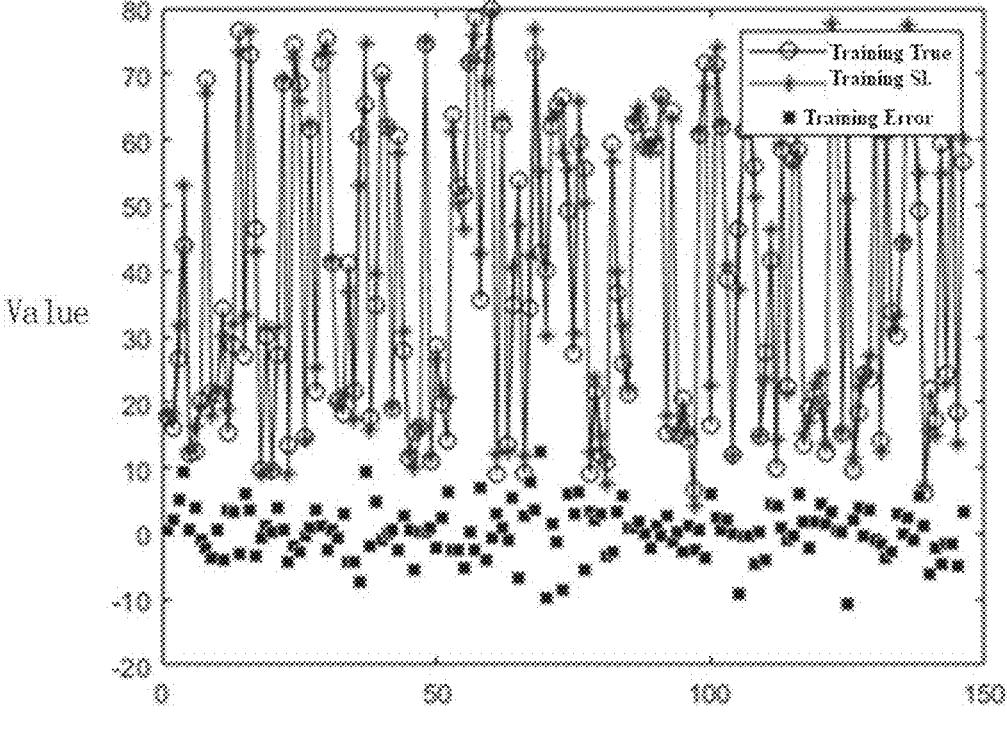
Figure 3D:
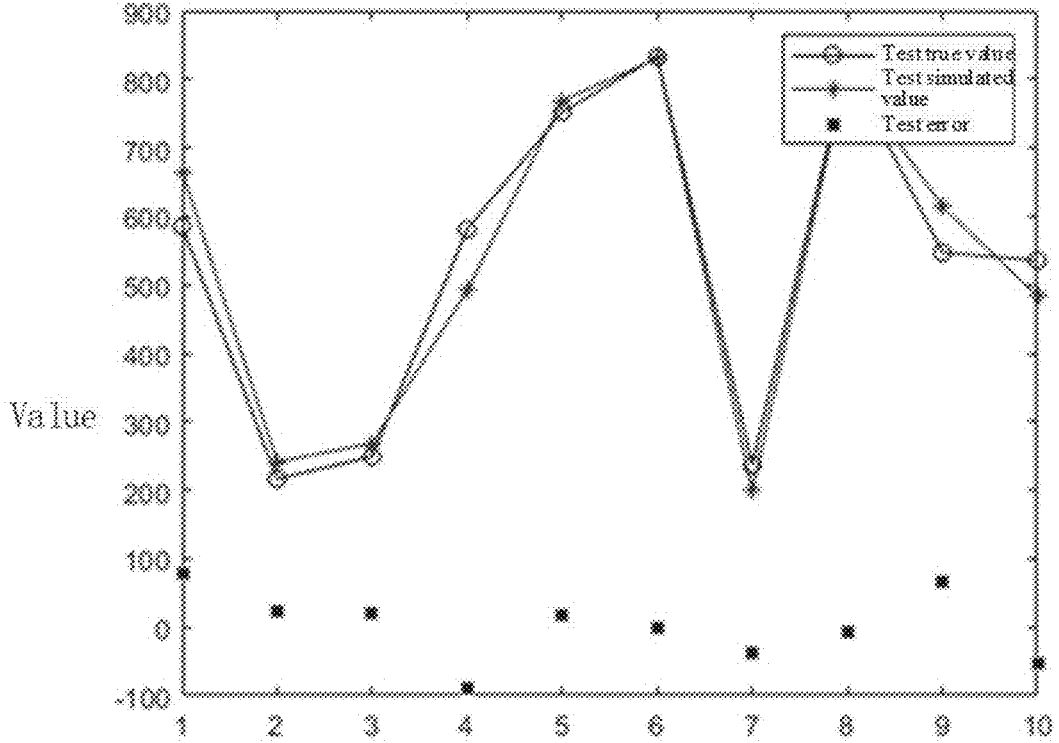
Figure 3E:
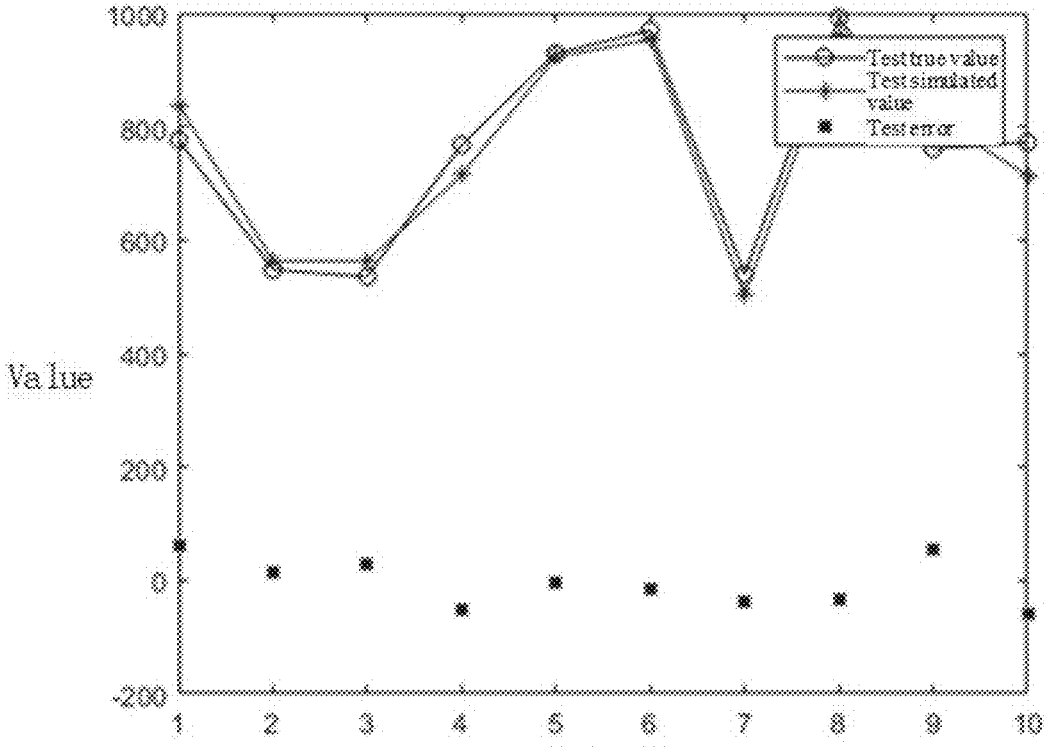
Figure 3F:
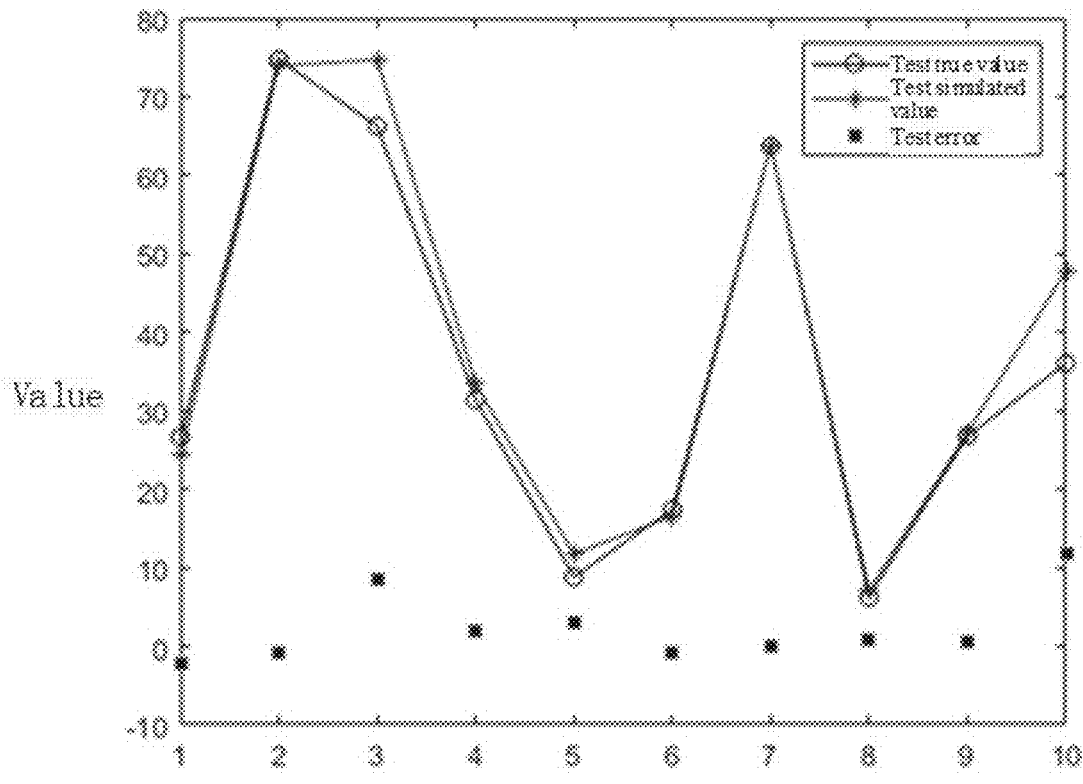
Figure 4A:
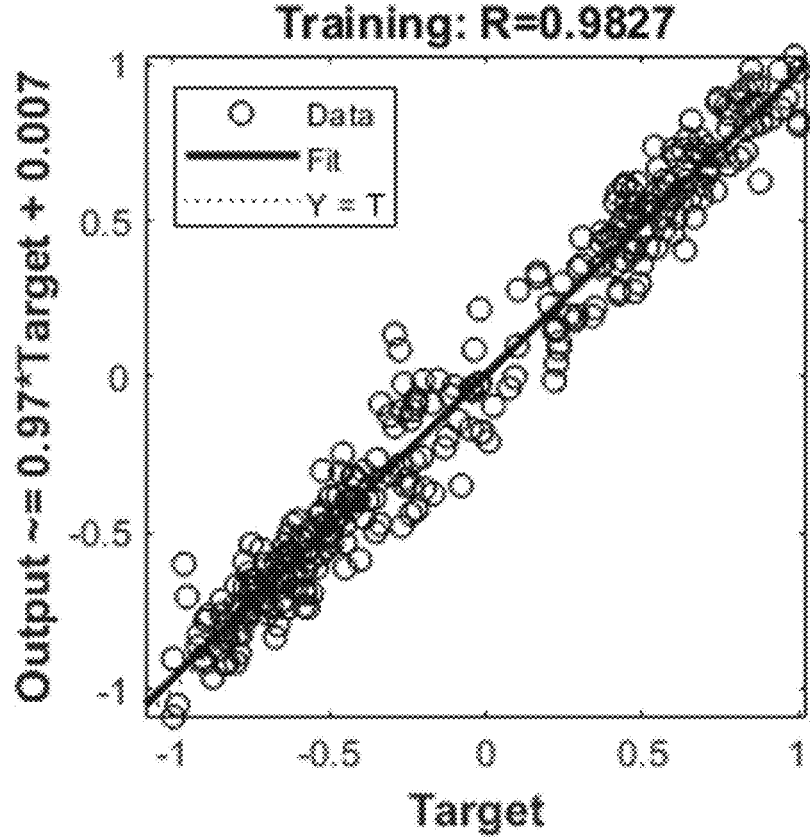
FIGS. 4A-4D show regression curve graphs of the training set, the validation set and the testing set.
Figure 4B:
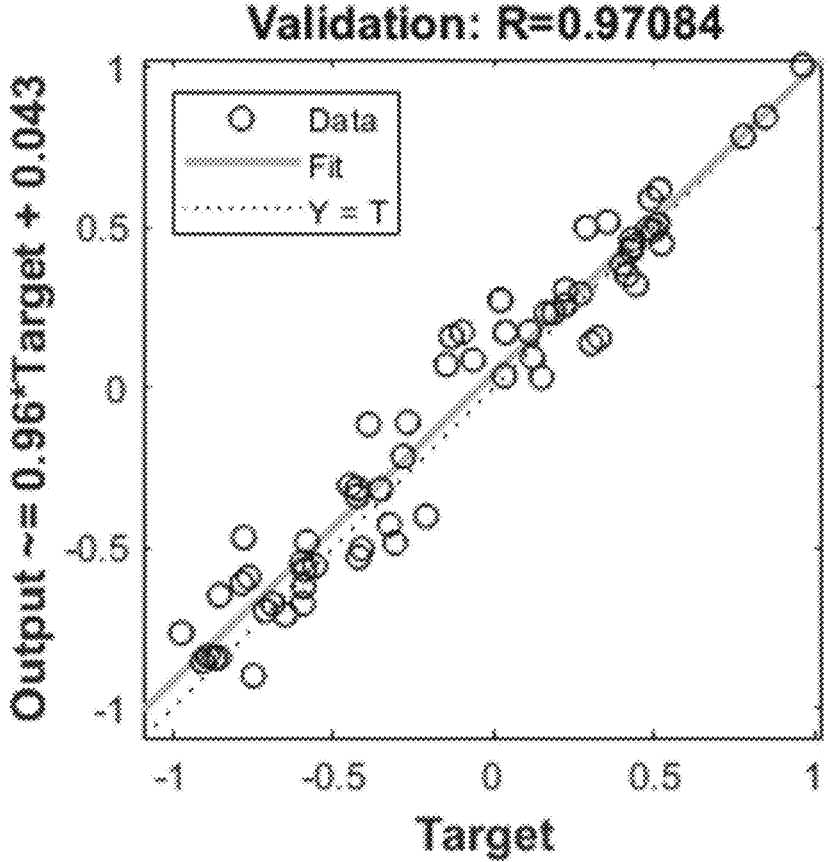
Figure 4C:
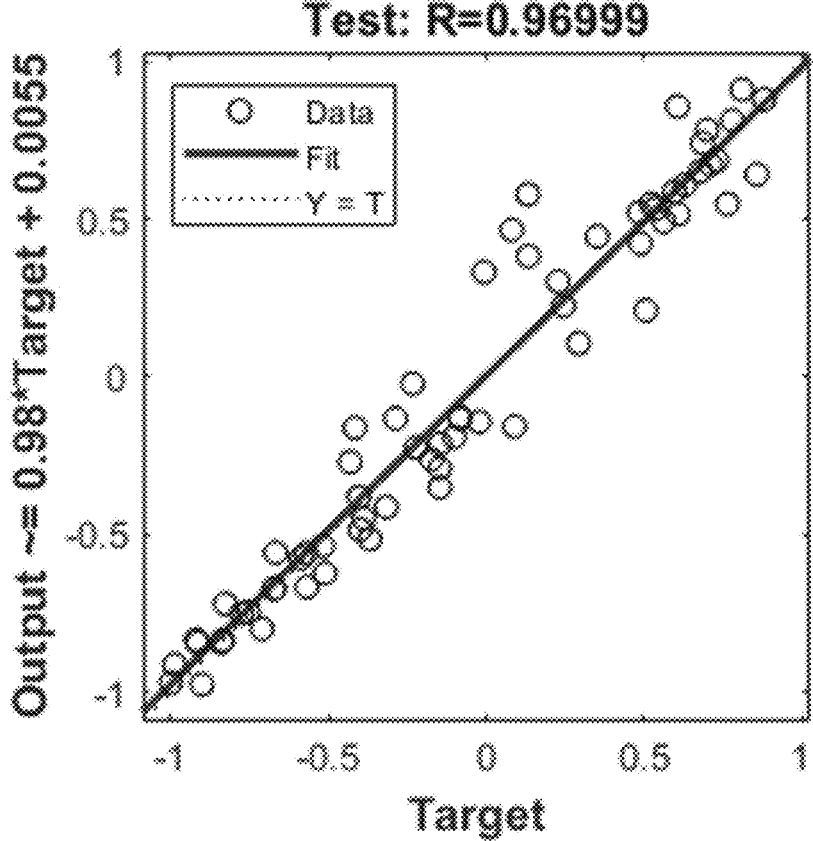
Figure 4D:
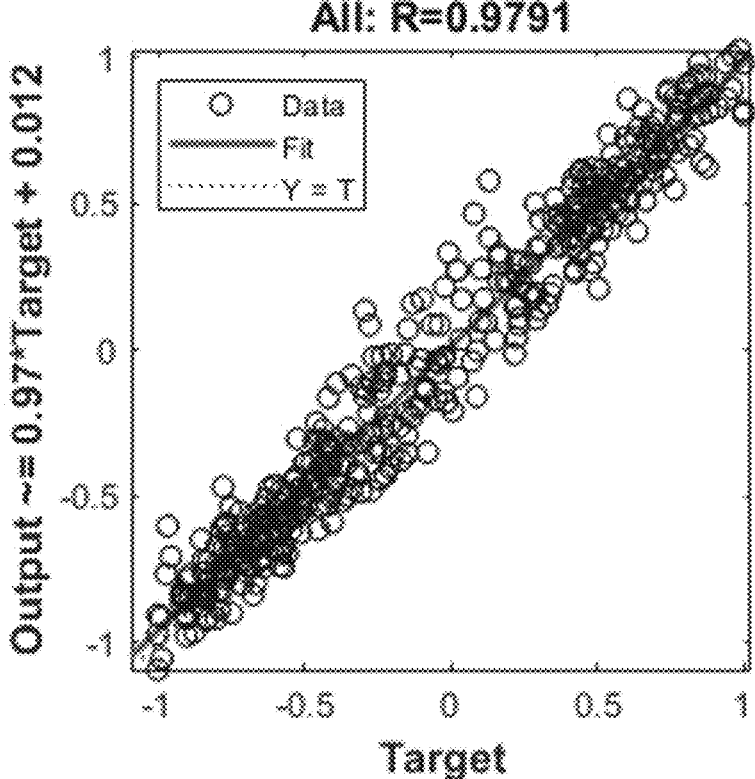

A three-layer BP network is shown in FIG. 2, and it is assumed that a number of neurons of the input layer is M, a number of neurons of the hidden layer is I, and a number of neurons of the output layer is J. An $m^{th}$ neuron of the input layer is recorded as $x_m$, an $i^{th}$ neuron of the hidden layer is recorded as $k_i$, and a $j^{th}$ neuron of the output layer is recorded as $y_j$. A connection weight from $x_m$ to $k_i$ is $$\omega_{mi}^1$$

and a connection threshold is $$b_i^1;$$

and a connection weight from $k_i$ to $y_j$ is $$\omega_{ij}^2$$

and a connection threshold is $$b_j^2.$$

The transfer function of the hidden layer is the Sigmod function, and the transfer function of the output layer is the linear function. An input and an output of each layer are represented with u and v, for example, $$v_M^2$$

represents an output of a $2^{rd}$ neuron of an M layer (which is namely the input layer). An actual output of the network is $$Y(n) = \left[ v_J^1,\ v_J^2,\ \ldots\ ,\ v_J^J \right],$$

and an expected output of the network is d(n)=[d$_1$, d$_2$, . . . , d$_J$], where n is a number of iterations. An error of an $n^{th}$ iteration is defined as $e_j(n)=d_j(n)-Y_j(n)$ and a total error is $$E(n) = \frac{1}{2} \sum\nolimits_{j=1}^{J} e_j^2(n).$$

An input signal of the network is $$u_M(n) = \left[ u_M^1,\ u_M^2,\ \ldots\ ,\ u_M^M \right]'.$$

$u_M(1)$ represents in initial input value of the network.

A weight matrix $W^1$ between the neuron of the input layer and the neuron of the hidden layer and a weight matrix $W^2$ between the neuron of the hidden layer and the neuron of the output layer are respectively as follows:

$$W^1(n) = \begin{bmatrix} \omega_{11}^1 & \omega_{12}^1 & \cdots & \omega_{1i}^1 & \cdots & \omega_{1I}^1 \\ \omega_{21}^1 & \omega_{22}^1 & \cdots & \omega_{2i}^1 & \cdots & \omega_{2I}^1 \\ \vdots & \vdots & & \vdots & & \vdots \\ \omega_{m1}^1 & \omega_{m2}^1 & \cdots & \omega_{mi}^1 & \cdots & \omega_{mI}^1 \\ \vdots & \vdots & & \vdots & & \vdots \\ \omega_{M1}^1 & \omega_{M2}^1 & \cdots & \omega_{Mi}^1 & \cdots & \omega_{MI}^1 \end{bmatrix},$$

and $$W^2(n) = \begin{bmatrix} \omega_{11}^2 & \omega_{12}^2 & \cdots & \omega_{1j}^2 & \cdots & \omega_{1J}^2 \\ \omega_{21}^2 & \omega_{22}^2 & \cdots & \omega_{2j}^2 & \cdots & \omega_{2J}^2 \\ \vdots & \vdots & & \vdots & & \vdots \\ \omega_{i1}^2 & \omega_{i2}^2 & \cdots & \omega_{ij}^2 & \cdots & \omega_{iJ}^2 \\ \vdots & \vdots & & \vdots & & \vdots \\ \omega_{I1}^2 & \omega_{I2}^2 & \cdots & \omega_{Ij}^2 & \cdots & \omega_{IJ}^2 \end{bmatrix}.$$

A threshold $b^1(n)$ of the neuron of the hidden layer and a threshold $b^2(n)$ of the neuron of the output layer are respectively as follows:

$$b^1(n) = \left[ b_1^1, b_2^1, \ldots\ , b_i^1 \right]',\ b^2(n) = \left[ b_1^2, b_2^2, \ldots\ , b_j^2 \right]'.$$

In step 5, a working signal of the neural network is forwardly propagated.

The output of the input layer is equal to an input signal of the network:

$$v_M^m(n) = u_M^m(n).$$

The input of the $i^{th}$ neuron of the hidden layer is equal to a weighted sum of the output of the input layer:

$$u_I^i(n) = \sum\nolimits_{m=1}^{M} \omega_{mi}^1(n) v_M^m(n) - b_i^1(n).$$

The output of the $i^{th}$ neuron of the hidden layer is equal to:

$$v_I^i(n) = f\big(u_I^i(n)\big).$$

$f(\cdot)$ is the transfer function of the hidden layer, which is generally the Sigmod function.

The input of the $j^{th}$ neuron of the output layer is equal to a weighted sum of the output of the hidden layer:

$$u_J^j(n) = \sum_{i=1}^{J} \omega_{ij}^2(n)v_I^i(n) - b_j^2(n).$$

The output of the $j^{th}$ neuron of the output layer is equal to:

$$v_J^j(n) = g\big(u_J^j(n)\big).$$

$g(\cdot)$ is the transfer function of the output layer, which is generally the linear function.

An error of the $j^{th}$ neuron of the output layer is equal to:

$$e_j(n) = d_j(n) - v_J^j(n).$$

A total error of the network is:

$$E(n) = \frac{1}{2}\sum_{j=1}^{J} e_j^2(n) =$$

$$\frac{1}{2}\sum_{j=1}^{J}\left\{ d_j(n) - g\left[\sum_{i=1}^{J}\omega_{ij}^2(n)f\left(\sum_{m=1}^{M}\omega_{mi}^1(n)v_M^m(n) - b_i^1(n)\right) - b_j^2(n)\right]\right\}^2 .$$

In step 6, an error signal of the neural network is reversely propagated.

1. In a weight and threshold adjustment stage, the weight and the threshold are reversely adjusted layer by layer along the neural network, and the weight $$\omega_{ij}^2$$

and the threshold $$b_j^2$$

between the hidden layer and the output layer are adjusted first.

A partial derivative of the total error to the weight $$\omega_{ij}^2$$

between the hidden layer and the output layer is:

$$\frac{\partial E(n)}{\partial \omega_{ij}^2(n)} = \frac{\partial E(n)}{\partial e_j(n)} \cdot \frac{\partial e_j(n)}{\partial v_J^j(n)} \cdot \frac{\partial v_J^j(n)}{\partial u_J^j(n)} \cdot \frac{\partial u_J^j(n)}{\partial \omega_{ij}^2(n)} =$$

$$e_j(n)\cdot(-1)\cdot g'\big(u_J^j(n)\big)\cdot v_I^i(n) = -e_j(n)g'\big(u_J^j(n)\big)v_I^i(n).$$

A partial derivative of the total error to the threshold $$b_j^2$$

between the hidden layer and the output layer is:

$$\frac{\partial E(n)}{\partial b_j^2(n)} = \frac{\partial E(n)}{\partial e_j(n)} \cdot \frac{\partial e_j(n)}{\partial v_J^j(n)} \cdot \frac{\partial v_J^j(n)}{\partial u_J^j(n)} \cdot \frac{\partial u_J^j(n)}{\partial b_j^2(n)} =$$

$$e_j(n)\cdot(-1)\cdot g'\big(u_J^j(n)\big)\cdot(-1) = e_j(n)g'\big(u_J^j(n)\big).$$

A local gradient is:

$$\delta_J^j = -\frac{\partial E(n)}{\partial u_J^j(n)} = -\frac{\partial E(n)}{\partial e_j(n)} \cdot \frac{\partial e_j(n)}{\partial v_J^j(n)} \cdot \frac{\partial v_J^j(n)}{\partial u_J^j(n)} = e_j(n)g'\big(u_J^j(n)\big).$$

2. The error signal is forwardly propagated, and the weight $$\omega_{mi}^1$$

and the threshold $$b_i^1$$

between the input layer and the hidden layer are adjusted.

A partial derivative of the total error to the weight $$\omega_{mi}^1$$

between the input layer and the hidden layer is:

$$\frac{\partial E(n)}{\partial \omega_{mi}^1} = \frac{\partial E(n)}{\partial e_j(n)} \cdot \frac{\partial e_j(n)}{\partial v_J^j(n)} \cdot \frac{\partial v_J^j(n)}{\partial u_J^j(n)} \cdot \frac{\partial u_J^j(n)}{\partial v_I^i(n)} \cdot \frac{\partial v_I^i(n)}{\partial u_I^i(n)} \cdot \frac{\partial u_I^i(n)}{\partial \omega_{mi}^1} =$$

$$-\sum_{j=1}^{J}\big(\delta_J^j \cdot \omega_{ij}^2(n)\big)\cdot f'\big(u_I^i(n)\big)\cdot v_M^m(n).$$

A partial derivative of the total error to the threshold $$b_i^1$$

between the input layer and the hidden layer is:

$$\frac{\partial E(n)}{\partial b_i^1(n)} = \frac{\partial E(n)}{\partial e_j(n)} \cdot \frac{\partial e_j(n)}{\partial v_j^j(n)} \cdot \frac{\partial v_j^j(n)}{\partial u_j^j(n)} \cdot \frac{\partial u_j^j(n)}{\partial v_I^i(n)} \cdot \frac{\partial v_I^i(n)}{\partial u_I^i(n)} \cdot \frac{\partial u_I^i(n)}{\partial b_i^1(n)} =$$

$$-\sum_{j=1}^{J}\left(\delta_J^j \cdot \omega_{ij}^2(n)\right) \cdot f'\left(u_I^i(n)\right) \cdot (-1).$$

A local gradient is:

$$\delta_I^i = - \cdot \frac{\partial E(n)}{\partial u_I^i(n)} =$$

$$-\frac{\partial E(n)}{\partial v_I^i(n)} \cdot \frac{\partial v_I^i(n)}{\partial u_I^i(n)} = -\frac{\partial E(n)}{\partial v_I^i(n)} \cdot f'\left(u_I^i(n)\right) = \sum_{j=1}^{J}\left(\delta_J^j \cdot \omega_{ij}^2(n)\right) \cdot f'\left(u_I^i(n)\right).$$

The local gradient of the neuron is equal to a product of the error signal of the neuron and the derivative of the transfer function.

So, the weight and the threshold are denoted with the local gradient as:

$$\frac{\partial E(n)}{\partial \omega_{ij}^2(n)} = -\delta_J^j v_I^i(n);$$

$$\frac{\partial E(n)}{\partial b_j^2(n)} = \delta_J^j;$$

$$\frac{\partial E(n)}{\partial \omega_{mi}^1} = -\delta_I^i v_M^m(n);$$

$$\frac{\partial E(n)}{\partial b_i^1(n)} = \delta_I^i.$$

In step 7, an error value matrix and a Jacobian matrix are calculated.

An error value matrix of Q samples is:

$$e(n) = \begin{bmatrix} e_{11}(n) & e_{12}(n) & \cdots & e_{1q}(n) & \cdots & e_{1Q}(n) \\ e_{21}(n) & e_{22}(n) & \cdots & e_{2q}(n) & \cdots & e_{2Q}(n) \\ \vdots & \vdots & & \vdots & & \vdots \\ e_{j1}(n) & e_{j2}(n) & \cdots & e_{jq}(n) & \cdots & e_{jQ}(n) \\ \vdots & \vdots & & \vdots & & \vdots \\ e_{J1}(n) & e_{J2}(n) & \cdots & e_{Jq}(n) & \cdots & e_{JQ}(n) \end{bmatrix}.$$

An element of the Jacobian matrix is:

$$J_{jq}(n) = \begin{bmatrix} \frac{\partial e_{jq}(n)}{\partial \omega_{11}^2(n)} & \frac{\partial e_{jq}(n)}{\partial \omega_{12}^2(n)} & \cdots & \frac{\partial e_{jq}(n)}{\partial \omega_{1j}^2(n)} & \cdots & \frac{\partial e_{jq}(n)}{\partial \omega_{1J}^2(n)} \\ \frac{\partial e_{jq}(n)}{\partial \omega_{21}^2(n)} & \frac{\partial e_{jq}(n)}{\partial \omega_{22}^2(n)} & \cdots & \frac{\partial e_{jq}(n)}{\partial \omega_{2j}^2(n)} & \cdots & \frac{\partial e_{jq}(n)}{\partial \omega_{2J}^2(n)} \\ \vdots & \vdots & & \vdots & & \vdots \\ \frac{\partial e_{jq}(n)}{\partial \omega_{i1}^2(n)} & \frac{\partial e_{jq}(n)}{\partial \omega_{i2}^2(n)} & \cdots & \frac{\partial e_{jq}(n)}{\partial \omega_{ij}^2(n)} & \cdots & \frac{\partial e_{jq}(n)}{\partial \omega_{iJ}^2(n)} \\ \vdots & \vdots & & \vdots & & \vdots \\ \frac{\partial e_{jq}(n)}{\partial \omega_{J1}^2(n)} & \frac{\partial e_{jq}(n)}{\partial \omega_{J2}^2(n)} & \cdots & \frac{\partial e_{jq}(n)}{\partial \omega_{Ij}^2(n)} & \cdots & \frac{\partial e_{jq}(n)}{\partial \omega_{IJ}^2(n)} \end{bmatrix}.$$

A structure of the Jacobian matrix is:

$$J(n) = \begin{bmatrix} J_{11}(n) & J_{12}(n) & \cdots & J_{1q}(n) & \cdots & J_{1Q}(n) \\ J_{21}(n) & J_{22}(n) & \cdots & J_{2q}(n) & \cdots & J_{2Q}(n) \\ \vdots & \vdots & & \vdots & & \vdots \\ J_{j1}(n) & J_{j2}(n) & \cdots & J_{jq}(n) & \cdots & J_{jQ}(n) \\ \vdots & \vdots & & \vdots & & \vdots \\ J_{J1}(n) & J_{J2}(n) & \cdots & J_{Jq}(n) & \cdots & J_{JQ}(n) \end{bmatrix}.$$

Similarly, the Jacobian matrix of the weights of the input layer and the hidden layer may be obtained.

When an error performance function has a form of square sum error, a Hessian matrix may be approximately denoted as $H=J^T J$; and a gradient may be demoted as $g=J^T e$, wherein J is a Jacobian matrix of a first derivative of the error performance function to the weight of the network.

In step 8, a weight and a threshold of the neural network are updated.

Adjustment amount $\Delta\omega=$learning rate $\eta\cdot$local gradient $\delta\cdot$output signal of previous layer v.

Due to uncertain reversibility of $J^T J$, a unit matrix U is introduced to obtain $H=J^T J+\mu U$.

A weight and a threshold of the LM algorithm are corrected according to the following formula:

$$\omega(n+1)=w(n)-[J^T J+\mu U]^{-1} J^T e.$$

When $\mu=0$, the LM algorithm is degenerated into a Newton Method.

A weight update formula is as follows:

$$\omega_{ij}^2(n+1) = \omega_{ij}^2(n) - \left[J^2(n)^T J^2(n) + \mu U\right]^{-1} \eta J^2(n)^T e_j(n) v_I^i(n)$$

$$\omega_{mi}^1(n+1) =$$

$$\omega_{mi}^1(n) - \left[J^1(n)^T J^1(n) + \mu U\right]^{-1} \eta J^1(n)^T \sum_{j=1}^{J}\left(J^2(n)e_j(n)\omega_{ij}^2(n)\right) v_I^i(n) v_M^m(n).$$

A threshold update formula is as follows:

$$b_j^2(n+1) = b_j^2(n) - \left[J^2(n)^T J^2(n) + \mu U\right]^{-1} \eta J^2(n)^T e_j(n) v_I^i(n)$$

$$b_i^1(n+1) =$$

$$b_i^1(n) - \left[J^1(n)^T J^1(n) + \mu U\right]^{-1} \eta J^1(n)^T \sum_{j=1}^{J}\left(J^2(n)e_j(n)\omega_{ij}^2(n)\right) v_I^i(n) v_M^m(n).$$

In step 9, error calculation and neural network testing are performed.

An error value is calculated, and whether a MSE error formula meets a precision requirement is judged. When the MSE error formula does not meet the precision requirement, the iteration is continued. When the MSE error formula meets the precision requirement, the iteration is stopped. It is usually necessary to set one maximum number of iterations to prevent a program from entering a closed loop.

After finishing training of the neural network, the testing set is tested.

After finishing training of N iterations, a group of optimum weights $$\omega_{mi}^1(N) \text{ and } \omega_{ij}^2(N),$$

and a group of optimum thresholds $$b_i^1(N) \text{ and } b_j^2(N)$$

are obtained, and the normalized data $$u_M^m(1)$$

of the testing set is input. An output result Y(N) of the network is obtained by iterating once through the above calculation.

An actual predicted value y should be obtained by inversely normalizing the output result of the network. The inverse normalization is realized by a mapminmax function, and an algorithm principle is as follows.

1. $Y = Y(N)*(x_{max} - x_{min}) + x_{min}$, the [0, 1] interval is inversely normalized.

2. $y = \frac{1}{2}(Y(N) + 1)*(x_{max} - x_{min}) + x_{min}$.

the [−1, 1] interval is inversely normalized.

In the embodiment, data [x, o] is input into the BP neural network model, and predicted values of the yield strength, the tensile strength and the elongation after fracture are output, and compared with the corresponding real values. Relative errors refer to Table 1.

TABLE 1

| | | Prediction results of BP neural network | | | | | | | | Average value ARE |
|---|---|---|---|---|---|---|---|---|---|---|
| Output | Data set | Partial relative error value RE | | | | | | | | |
| Yield strength | Training set | 0.053581 | 0.042883 | 0.067611 | 0.053592 | 0.016761 | 0.08837 | 0.025762 | 0.11111 | 0.086146 |
| | Testing set | 0.13623 | 0.077594 | 0.021944 | 0.010062 | 0.12235 | 0.09662 | 0.13623 | 0.11435 | 0.089153 |
| Tensile strength | Training set | 0.049592 | 0.026637 | 0.050726 | 0.10438 | 0.022479 | 0.013203 | 0.063114 | 0.056277 | 0.04805 |
| | Testing set | 0.080171 | 0.027546 | 0.05005 | 0.069319 | 0.0064048 | 0.016949 | 0.032492 | 0.074133 | 0.04969 |
| Elongation after fracture | Training set | 0.029178 | 0.13184 | 0.19602 | 0.057457 | 0.039334 | 0.022855 | 0.074339 | 0.056146 | 0.10564 |
| | Testing set | 0.083664 | 0.010158 | 0.12724 | 0.065606 | 0.049305 | 0.016366 | 0.00012153 | 0.14725 | 0.116 |

A true value, a simulated value and an absolute error of each group of data are shown in FIGS. 3A-3F.

Regression curves of the training set, a verification set and the testing set are shown in FIGS. 4A-4D.

It can be seen from Table 1 that the error of each testing set is slightly larger than that of the training set, so that better model training is realized. It can be seen from FIGS. 3A-3F that the simulated value and the true value of the data set are approximate, so that the prediction result is more accurate. It can be seen from FIGS. 4A-4D that a correlation coefficient of the training set is less than 0.9827, a correlation coefficient of the verification set is 0.98084, and a correlation coefficient of the testing set is 0.96999, which are all approximate to 1, so that a good regression capability is provided.

Figure 5:
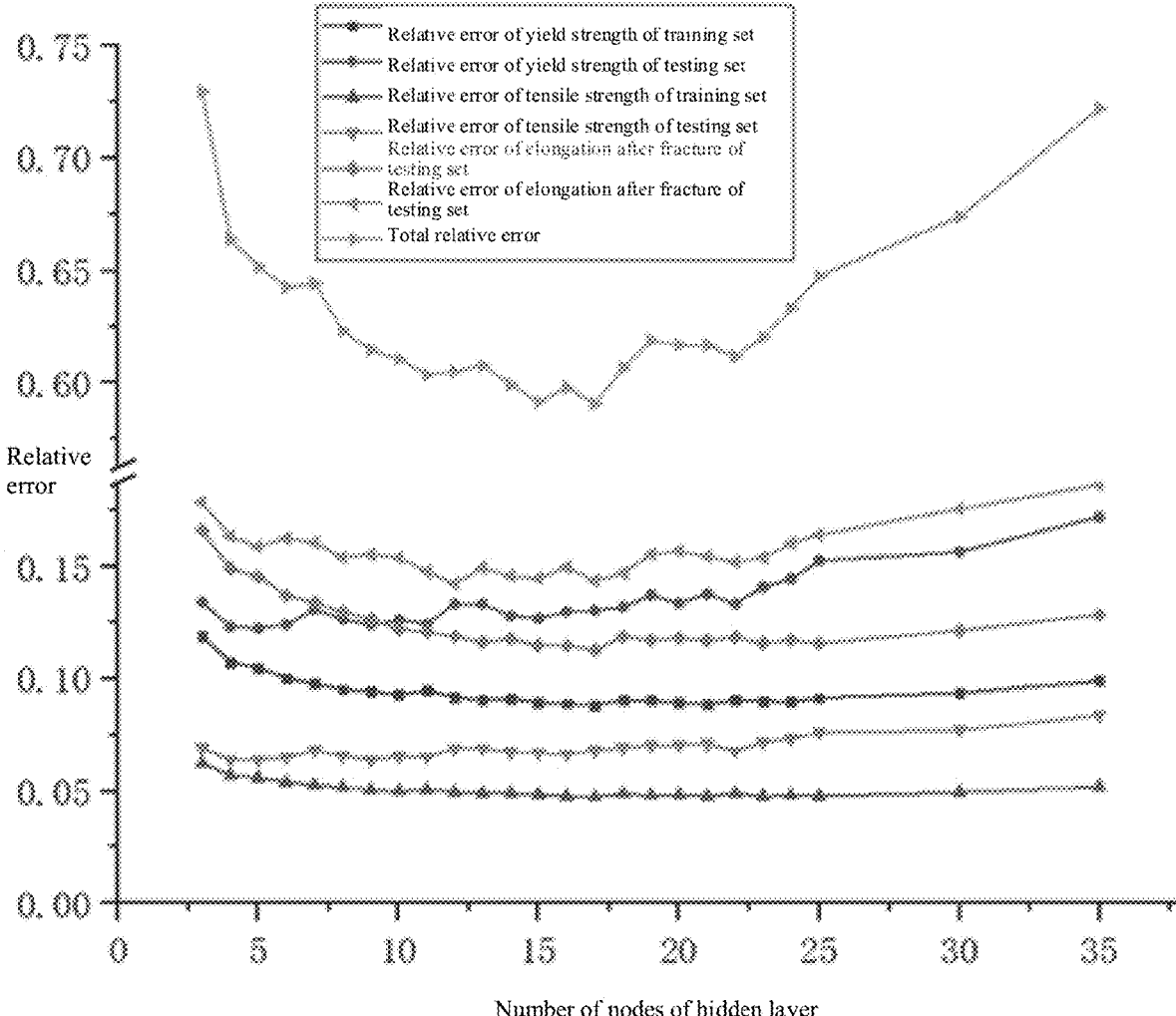
FIG. 5 shows a graph of an average relative error of different numbers of neurons of a hidden layer.

Different numbers of neurons of the hidden layer are selected to train and test the BP network, and 10 experiments are performed according to a 10-fold cross-validation method to obtain an average relative error change as shown in FIG. 5.

It can be seen from FIG. 5 that with the increase of the number of neurons of the hidden layer, the relative error value is reduced at first and then increased. When the number of neurons is 15 or 17, the relative error is lower and the prediction capability is better.

Different training functions of the neural network are selected to train and test the BP network, and 10 experiments are performed according to the 10-fold cross-validation method to obtain an average relative error change as shown in Table 2.

FIG. 2 Relative errors of different training functions in the case of optimum number of neurons of hidden layer A comprehensive quantitative evaluation method is employed to evaluate a quality of heat treatment, and relevant definitions are as follows:

a relative performance index is: $RI_i = \overline{C_i^1}/\overline{C_i}$, an equivalent performance index is: $EI_i = \overline{C_i^1}/\overline{C_i} - 1$, and a comprehensive performance index is: $IV = EI \cdot W$. $\overline{C_i^1}$ represents an actually measured average value of a certain mechanical performance index, $\overline{C_i}$ represents an expected value or a median value of the performance index, and W represents a corresponding weight coefficient, which is generally based on a failure rate of a workpiece when the mechanical performance index is not reached in an actual use process.

Mechanical performance requirements of annealed 316L stainless steel specified in national standards refer to Table 3.

TABLE 3

| Mechanical performances of annealed 316L stainless steel | | | | |
| --- | --- | --- | --- | --- |
| | | | Mechanical performance≥ | |
| Material | State | $R_{p0.2}$/MPa | Tensile strength/ MPa | Elongation/ % |
| 316L | Annealing | 175 | 480 | 40 |

In order to make the annealed 316L have good strength and plasticity, the weight coefficient may be taken as the tensile strength:elongation=1:1 to quantitatively evaluate the quality of heat treatment when the yield strength meets the requirements. An annealing process of the 316L stainless steel with a thickness of 0.02 mm to 0.05 mm in a certain factory is as follows: an annealing temperature is 950° C., a running speed of steel strip is 10 m/min to 15 m/min, a

| Algorithm | Optimum number of neurons of hidden layer | Number of iterations | Average relative error ARE | | | | | | |
| --- | --- | --- | --- | --- | --- | --- | --- | --- | --- |
| | | | Yield strength | | Tensile strength | | Elongation after fracture | | |
| | | | Training set | Testing set | Training set | Testing set | Training set | Testing set | Total |
| trainlm | 17 | 20-60 | 0.0883 | 0.1304 | 0.0476 | 0.0679 | 0.1126 | 0.1437 | 0.5905 |
| trainbfg | 20 | 45-120 | 0.0952 | 0.1216 | 0.0512 | 0.0653 | 0.1265 | 0.1599 | 0.6197 |
| traingdx | 18 | 174-522 | 0.1055 | 0.1331 | 0.0547 | 0.0677 | 0.141 | 0.1661 | 0.6681 |
| traingdm | 15 | >10000 | 0.1255 | 0.1509 | 0.0632 | 0.0744 | 0.1715 | 0.1964 | 0.7819 |
| trainscg | 16 | 34-143 | 0.0981 | 0.1225 | 0.0524 | 0.064 | 0.1291 | 0.1553 | 0.6214 |
| trainrp | 19 | 45-120 | 0.1041 | 0.1313 | 0.0555 | 0.0676 | 0.135 | 0.1657 | 0.6592 |

It can be seen from Table 2 that, compared with other training functions, the LM algorithm not only has a faster operation speed, but also can achieve and provide an optimum training effect. Compared with a BFG algorithm, an overall average relative error can be increased by 4.7%.

length of annealing furnace is 10.8 m, and the annealing lasts for 0.72 minute to 1.08 minutes.

Quantitative evaluation results of heat treatment of an annealing processes used in factory and a predicted annealing process of partial BP neural network refer to Table 4.

TABLE 4

| | | | Heat | | | | | | | Comprehensive |
| | Sampling | Annealing temperature | preservation time | Tensile strength | | | Elongation after fracture | | | performance value |
| | direction | ° C. | min | MPa | RI | EI | % | RI | EI | IV |
|---|---|---|---|---|---|---|---|---|---|---|
| Experimental | R | 950 | 1 | 645.35 | 1.344 | 0.344 | 52.84 | 1.321 | 0.321 | 0.665 |
| value | T | 950 | 1 | 652.86 | 1.36 | 0.36 | 54.796 | 1.37 | 0.37 | 0.73 |
| Predicated | R | 940 | 3 | 508.48 | 1.059 | 0.059 | 64.867 | 1.622 | 0.622 | 0.681 |
| value | T | 940 | 3 | 593.71 | 1.237 | 0.237 | 74.457 | 1.861 | 0.861 | 1.098 |
| | R | 960 | 2.5 | 524.9 | 1.094 | 0.094 | 64.476 | 1.611 | 0.612 | 0.706 |
| | T | 960 | 2.5 | 573.77 | 1.195 | 0.195 | 77.808 | 1.945 | 0.945 | 1.14 |

It can be seen from Table 4 that, when the quality of heat treatment is evaluated according to the weight coefficient that tensile strength:elongation=1:1, the 316L stainless steel has better comprehensive mechanical performances in the case that the annealing temperature is 940° C. and the heat preservation time is 3 minutes, or the annealing temperature is 960° C. and the heat preservation time is 2.5 minutes. Compared with the annealing process used in the factory—the annealing temperature is 950° C. and the heat preservation time is 1 minute, a comprehensive performance value in a T direction can be increased by 56.16% when the annealing temperature is 960° C. and the heat preservation time is 2.5 minutes.

What is not described in detail in the specification of the present invention belongs to the prior art known to those skilled in the art. The illustrative specific embodiments of the present invention are described above for the convenience of understanding the present invention by those skilled in the art, but it should be clear that the present invention is not limited to the scope of the specific embodiments. For those of ordinary skills in the art, as long as various changes are within the spirit and scope of the present invention defined and determined by the appended claims, these changes are obvious, and all inventions using the inventive concept are protected.

We claim:

1. A neural network model optimization method based on an annealing process for a stainless steel ultra-thin strip, wherein the stainless steel ultra-thin strip has a thickness on the order of several microns to tens of microns and exhibits a size effect, the method establishing a predictive model between annealing process parameters and material mechanical properties by training a single-hidden-layer error back-propagation neural network, wherein an error back propagation algorithm is employed to train the single-hidden-layer error back-propagation neural network, the neural network model optimization method comprising:

step 1: designing a network model, and determining a number of layers of the network, and a number of nodes of an input layer, a number of nodes of an output layer and a number of nodes of a hidden layer, and defining thresholds corresponding to neurons of each layer; wherein heat treatment temperature, heat preservation time, and sampling direction are selected as inputs of the network model, and wherein yield strength, tensile strength, and elongation after fracture and hardness are selected as outputs of the network model;

step 2: selecting transfer functions, a training method and training parameters, wherein the training method uses a Levenberg-Marquardt (LM) algorithm, wherein the training parameters needed by the single-hidden-layer error back propagation neural network comprise initial weights, initial values of the thresholds defined corresponding to the neurons of each layer, a learning rate, a momentum factor, a maximum number of iterations, and an error tolerance;

step 3: selecting sample data based on step 2, dividing the sample data into a training set and a testing set, and performing data preprocessing;

step 4: setting and initializing parameters of the neural network;

step 5: adjusting forward propagation of a working signal of the neural network;

step 6: adjusting back propagation of an error signal of the neural network;

step 7: calculating an error value matrix and a Jacobian matrix;

step 8: updating weights and thresholds of the neural network according to the LM algorithm and the Jacobian matrix; and step 9: performing error calculation and testing of the trained single hidden layer neural network.

2. The neural network model optimization method based on the annealing process for the stainless steel ultra-thin strip according to claim 1, wherein the single hidden layer neural network is implemented as a multi-layer network with one hidden layer.

3. The neural network model optimization method based on the annealing process for the stainless steel ultra-thin strip according to claim 2, wherein the selecting the sample data according to the step 2, dividing the sample data into the training set and the testing set, and performing the data preprocessing in the step 3, further comprises the following steps of:

step 3.1: dividing the sample data into the training set and the testing set; and step 3.2: normalizing samples in the training set and the testing set.

4. The neural network model optimization method based on the annealing process for the stainless steel ultra-thin strip according to claim 3, wherein the normalizing the samples of the training set and the testing set in the step 3.2 comprises: mapping data to [0, 1] or [−1, 1] by using a mapminmax function, and recording an input in a data set as x and an output in the data set as o, comprising:

normalizing the samples to [0, 1] by a formula $u_M(1)=(x-x_{min})/(x_{max}-x_{min})$; and normalizing the samples to [−1, 1] by a formula $u_M(1)=2*(x-x_{min})/(x_{max}-x_{min})-1$, wherein $u_M(1)$ represents an initial input value of the network, wherein $x_{max}$ represents a maximum input value, and $x_{min}$ represents a minimum input value; and normalizing the output o in the data set using corresponding normalization formulas to obtain an expected output d(n) of the network, wherein when the input data is normalized to [0, 1], the output o is normalized according to $d(n)=(o-o_{min})/(o_{max}-o_{min})$; and wherein when the input data is normalized to [−1, 1], the output o is normalized according to $d(n)=2*(o-o_{min})/(o_{max}-o_{min})-1$; where $o_{-max}$ and $o_{-min}$ represent a maximum and a minimum value of the output o, respectively.

5. The neural network model optimization method based on the annealing process for the stainless steel ultra-thin strip according to claim 4, wherein a specific method for the setting and initializing the parameters of the neural network in the step 4, comprises: implementing the single hidden layer neural network as a three-layer neural network, setting a transfer function of the hidden layer as a Sigmod function, and setting a transfer function of the output layer as a linear function; and representing an input and an output of each layer by u and v, wherein:

an input of the input layer is $$u_M^m(n)$$

and an output of the input layer is $$v_M^m(n);$$

an input of the hidden layer is $$u_I^i(n)$$

and an output of the hidden layer is $$v_I^i(n);$$

an input of the output layer is $$u_J^j(n)$$

and an output of the output layer is $$v_J^j(n);$$

a number of neurons of the input layer is M and an $m^{th}$ neuron of the input layer is recorded as $x_m$;
a number of neurons of the hidden layer is I and an $i^{th}$ neuron of the hidden layer is recorded as $k_i$;
a number of neurons of the output layer is J and a $j^{th}$ neuron of the output layer is recorded as $y_j$;
a connection weight from $x_m$ to $k_i$ is $$\omega_{mi}^1$$

and a connection threshold corresponding to the neuron $k_i$ of the hidden layer is $$b_i^1;$$

a connection weight from $k_i$ to $y_j$ is $$\omega_{ij}^2$$

and a connection threshold corresponding to the neuron $y_j$ of the output layer is $$b_j^2;$$

an input signal of the network is denoted as $$u_M(n) = \left[u_M^1, u_M^2, \ldots, u_M^M\right]';$$

an actual output of the network is denoted as $$Y(n) = \left[v_J^1, v_J^2, \ldots, v_J^J\right];$$

an expected output of the network is denoted as $$d(n) = [d_1, d_2, \ldots, d_J];$$

wherein n represents a number of iterations, and d represents an output value of the sample data;
an error of the $j^{th}$ neuron of the output layer in an $n^{th}$ iteration is denoted as $e_j(n)=d_j(n)-Y_j(n)$, and
a total error is denoted as $$E(n) = \frac{1}{2}\sum_{j=1}^{J} e_j^2(n),$$

wherein e represents the error;
a weight matrix $W^1$ between the neuron of the input layer and the neuron of the hidden layer is:

$$W^1(n) = \begin{bmatrix} \omega_{11}^1 & \omega_{12}^1 & \cdots & \omega_{1i}^1 & \cdots & \omega_{1I}^1 \\ \omega_{21}^1 & \omega_{22}^1 & \cdots & \omega_{2i}^1 & \cdots & \omega_{2I}^1 \\ \vdots & \vdots & & \vdots & & \vdots \\ \omega_{m1}^1 & \omega_{m2}^1 & \cdots & \omega_{mi}^1 & \cdots & \omega_{mI}^1 \\ \vdots & \vdots & & \vdots & & \vdots \\ \omega_{M1}^1 & \omega_{M2}^1 & \cdots & \omega_{Mi}^1 & \cdots & \omega_{MI}^1 \end{bmatrix};$$

a weight matrix $W^2$ between the neuron of the hidden layer and the neuron of the output layer is:

$$W^2(n) = \begin{bmatrix} \omega_{11}^2 & \omega_{12}^2 & \cdots & \omega_{1j}^2 & \cdots & \omega_{1J}^2 \\ \omega_{21}^2 & \omega_{22}^2 & \cdots & \omega_{2j}^2 & \cdots & \omega_{2J}^2 \\ \vdots & \vdots & & \vdots & & \vdots \\ \omega_{i1}^2 & \omega_{i2}^2 & \cdots & \omega_{ij}^2 & \cdots & \omega_{iJ}^2 \\ \vdots & \vdots & & \vdots & & \vdots \\ \omega_{I1}^2 & \omega_{I2}^2 & \cdots & \omega_{Ij}^2 & \cdots & \omega_{IJ}^2 \end{bmatrix};$$

a threshold $b^1(n)$ of the neuron of the hidden layer is:

$$b^1(n) = \left[ b_1^1, b_2^1, \ldots, b_i^1 \right]';$$

a threshold $b^2(n)$ of the neuron of the output layer is:

$$b^2(n) = \left[ b_1^2, b_2^2, \ldots, b_j^2 \right]'.$$

6. The neural network model optimization method based on the annealing process for the stainless steel ultra-thin strip according to claim 5, wherein a specific method for the forward propagation of the working signal of the neural network in the step 5, comprises:

setting the output of the input layer to be equal to an input signal of the network:

$$v_M^m(n) = u_M^m(n);$$

setting the input of the $i^{th}$ neuron of the hidden layer to be equal to a weighted sum of the output of the input layer:

$$u_I^i(n) = \sum_{m=1}^{M} \omega_{mi}^1(n) v_M^m(n) - b_i^1(n);$$

and setting the output of the $i^{th}$ neuron of the hidden layer to be equal to the transfer function of the hidden layer:

$$v_I^i(n) = f\left( u_I^i(n) \right),$$

wherein $f(\bullet)$ is the transfer function of the hidden layer; setting the input of the $j^{th}$ neuron of the output layer to be equal to a weighted sum of the output of the hidden layer:

$$u_J^j(n) = \sum_{i=1}^{I} \omega_{ij}^2(n) v_I^i(n) - b_j^2(n);$$

and setting the output of the $j^{th}$ neuron of the output layer to be equal to the transfer function of the output layer:

$$v_J^j(n) = g\left( u_J^j(n) \right),$$

wherein $g(\bullet)$ is the transfer function of the output layer; so, an error of the $j^{th}$ neuron of the output layer is equal to:

$$e_j(n) = d_j(n) - v_J^j(n);$$

and
a total error of the network is denoted as:

$$E(n) = \frac{1}{2} \sum_{j=1}^{J} e_j^2(n) =$$

$$\frac{1}{2} \sum_{j=1}^{J} \left\{ d_j(n) - g \left[ \sum_{i=1}^{I} \omega_{ij}^2(n) f \left( \sum_{m=1}^{M} \omega_{mi}^1(n) v_M^m(n) - b_i^1(n) \right) - b_j^2(n) \right] \right\}^2.$$

7. The neural network model optimization method based on the annealing process for the stainless steel ultra-thin strip according to claim 6, wherein a specific method for the back propagation of the error signal of the neural network in the step 6, comprises:

step 6.1: in a weight and threshold adjustment stage, reversely adjusting layer by layer along the neural network, and adjusting the weight $$\omega_{ij}^2$$

and the threshold $$b_j^2$$

between the hidden layer and the output layer first; a partial derivative of the total error to the weight $$\omega_{ij}^2$$

between the hidden layer and the output layer being:

$$\frac{\partial E(n)}{\partial \omega_{ij}^2(n)} = \frac{\partial E(n)}{\partial e_j(n)} \cdot \frac{\partial e_j(n)}{\partial v_J^j(n)} \cdot \frac{\partial v_J^j(n)}{\partial u_J^j(n)} \cdot \frac{\partial u_J^j(n)}{\partial \omega_{ij}^2(n)} =$$

$$e_j(n) \cdot (-1) \cdot g'\left( u_J^j(n) \right) \cdot v_I^i(n) = -e_j(n) g'\left( u_J^j(n) \right) v_I^i(n),$$

a partial derivative of the total error to the threshold $$b_j^2$$

between the hidden layer and the output layer being:

$$\frac{\partial E(n)}{\partial b_j^2(n)} = \frac{\partial E(n)}{\partial e_j(n)} \cdot \frac{\partial e_j(n)}{\partial v_J^j(n)} \cdot \frac{\partial v_J^j(n)}{\partial u_J^j(n)} \cdot \frac{\partial u_J^j(n)}{\partial b_j^2(n)} =$$

$$e_j(n) \cdot (-1) \cdot g'\left( u_J^j(n) \right) \cdot (-1) = e_j(n) g'\left( u_J^j(n) \right),$$

a local gradient being:

$$\delta_J^j = -\frac{\partial E(n)}{\partial u_J^j(n)} = -\frac{\partial E(n)}{\partial e_j(n)} \cdot \frac{\partial e_j(n)}{\partial v_J^j(n)} \cdot \frac{\partial v_J^j(n)}{\partial u_J^j(n)} = e_j(n)g'\left(u_J^j(n)\right),$$

5 wherein g'(•) represents a derivative of a transfer function g(•) of the output layer; and step 6.2: forwardly propagating the error signal, and 10 adjusting the weight $$\omega_{mi}^1$$

15 and the threshold $$b_i^1$$

20 between the input layer and the hidden layer;

a partial derivative of the total error to the weight

25

$$\omega_{mi}^1$$

between the input layer and the hidden layer being: 30

$$\frac{\partial E(n)}{\partial \omega_{mi}^1} = \frac{\partial E(n)}{\partial e_j(n)} \cdot \frac{\partial e_j(n)}{\partial v_J^j(n)} \cdot \frac{\partial v_J^j(n)}{\partial u_J^j(n)} \cdot \frac{\partial u_J^j(n)}{\partial v_I^i(n)} \cdot \frac{\partial v_I^i(n)}{\partial u_I^i(n)} \cdot \frac{\partial u_I^i(n)}{\partial \omega_{mi}^1} =$$

35

$$-\sum_{j=1}^{J}\left(\delta_J^j \cdot \omega_{ij}^2(n)\right) \cdot f'\left(u_I^i(n)\right) \cdot v_M^m(n),$$

a partial derivative of the total error to the threshold 40

$$b_i^1$$

45 between the input later and the hidden layer being:

$$\frac{\partial E(n)}{\partial b_i^2(n)} = \frac{\partial E(n)}{\partial e_j(n)} \cdot \frac{\partial e_j(n)}{\partial v_J^j(n)} \cdot \frac{\partial v_J^j(n)}{\partial u_J^j(n)} \cdot \frac{\partial u_J^j(n)}{\partial v_I^i(n)} \cdot \frac{\partial v_I^i(n)}{\partial u_I^i(n)} \cdot \frac{\partial u_I^i(n)}{\partial b_i^2(n)} =$$

50

$$-\sum_{j=1}^{J}\left(\delta_J^i \cdot \omega_{ij}^2(n)\right) \cdot f'\left(u_I^i(n)\right) \cdot (-1),$$

55 a local gradient being:

$$\delta_I^i = -\frac{\partial E(n)}{\partial u_I^i(n)} =$$

60

$$-\frac{\partial E(n)}{\partial v_I^i(n)} \cdot \frac{\partial v_I^i(n)}{\partial u_I^i(n)} = -\frac{\partial E(n)}{\partial v_I^i(n)} \cdot f'\left(u_I^i(n)\right) = \sum_{j=1}^{J}\left(\delta_J^i \cdot \omega_{ij}^2(n)\right) \cdot f'\left(u_I^i(n)\right),$$

65 wherein f'(•) represents a derivative of the transfer function f(•) of the input layer; and the local gradient of the neuron is equal to a product of the error signal of the neuron and the derivative of the transfer function;

so, the weight and the threshold are denoted with the local gradient as:

$$\frac{\partial E(n)}{\partial \omega_{ij}^2(n)} = -\delta_J^j v_I^i(n);$$

$$\frac{\partial E(n)}{\partial b_j^2(n)} = \delta_J^j;$$

$$\frac{\partial E(n)}{\partial \omega_{mi}^1} = -\delta_I^i v_M^m(n);$$

$$\frac{\partial E(n)}{\partial b_i^1(n)} = \delta_I^i.$$

8. The neural network model optimization method based 20 on the annealing process for the stainless steel ultra-thin strip according to claim 7, wherein a specific method for the calculating the error value matrix and the Jacobian matrix in the step 7, comprises:

denoting an error value matrix of Q samples as:

$$e(n) = \begin{bmatrix} e_{11}(n) & e_{12}(n) & \cdots & e_{1q}(n) & \cdots & e_{1Q}(n) \\ e_{21}(n) & e_{22}(n) & \cdots & e_{2q}(n) & \cdots & e_{2Q}(n) \\ \vdots & \vdots & & \vdots & & \vdots \\ e_{j1}(n) & e_{j2}(n) & \cdots & e_{jq}(n) & \cdots & e_{jQ}(n) \\ \vdots & \vdots & & \vdots & & \vdots \\ e_{j1}(n) & e_{j2}(n) & \cdots & e_{jq}(n) & \cdots & e_{jQ}(n) \end{bmatrix};$$

denoting an element of the Jacobian matrix as:

$$J_{jq}(n) = \begin{bmatrix} \frac{\partial e_{jq}(n)}{\partial \omega_{11}^2(n)} & \frac{\partial e_{jq}(n)}{\partial \omega_{12}^2(n)} & \cdots & \frac{\partial e_{jq}(n)}{\partial \omega_{1j}^2(n)} & \cdots & \frac{\partial e_{jq}(n)}{\partial \omega_{1J}^2(n)} \\ \frac{\partial e_{jq}(n)}{\partial \omega_{21}^2(n)} & \frac{\partial e_{jq}(n)}{\partial \omega_{22}^2(n)} & \cdots & \frac{\partial e_{jq}(n)}{\partial \omega_{2j}^2(n)} & \cdots & \frac{\partial e_{jq}(n)}{\partial \omega_{2J}^2(n)} \\ \vdots & \vdots & & \vdots & & \vdots \\ \frac{\partial e_{jq}(n)}{\partial \omega_{i1}^2(n)} & \frac{\partial e_{jq}(n)}{\partial \omega_{i2}^2(n)} & \cdots & \frac{\partial e_{jq}(n)}{\partial \omega_{ij}^2(n)} & \cdots & \frac{\partial e_{jq}(n)}{\partial \omega_{iJ}^2(n)} \\ \vdots & \vdots & & \vdots & & \vdots \\ \frac{\partial e_{jq}(n)}{\partial \omega_{I1}^2(n)} & \frac{\partial e_{jq}(n)}{\partial \omega_{I2}^2(n)} & \cdots & \frac{\partial e_{jq}(n)}{\partial \omega_{Ij}^2(n)} & \cdots & \frac{\partial e_{jq}(n)}{\partial \omega_{IJ}^2(n)} \end{bmatrix};$$

denoting a structure of the Jacobian matrix as:

$$J(n) = \begin{bmatrix} J_{11}(n) & J_{12}(n) & \cdots & J_{1q}(n) & \cdots & J_{1Q}(n) \\ J_{21}(n) & J_{22}(n) & \cdots & J_{2q}(n) & \cdots & J_{2Q}(n) \\ \vdots & \vdots & & \vdots & & \vdots \\ J_{j1}(n) & J_{j2}(n) & \cdots & J_{jq}(n) & \cdots & J_{jQ}(n) \\ \vdots & \vdots & & \vdots & & \vdots \\ J_{j1}(n) & J_{j2}(n) & \cdots & J_{jq}(n) & \cdots & J_{jQ}(n) \end{bmatrix};$$

similarly, obtaining the Jacobian matrix of the weights of the input layer and the hidden layer;

H being a Hessian matrix of an error performance function, which contains second derivative information of the error function; when the error performance function has a form of square sum error, the Hessian matrix being approximately denoted as H=J$^T$J; and a gradient being demoted as g=$J^T$e, wherein J is a Jacobian matrix of a first derivative of the error performance function to the weight of the network.

9. The neural network model optimization method based on the annealing process for the stainless steel ultra-thin strip according to claim 8, wherein a specific method for the updating the weight and the threshold of the neural network in the step 8, comprises:

adjustment amount $\Delta\omega=\eta\cdot\delta\cdot v$, where $\eta$ denotes a learning rate, $\delta$ denotes a local gradient, and v denotes the output signal of the previous layer, and wherein the Levenberg-Marquardt (LM) algorithm is used for optimization;

due to uncertain reversibility of $J^TJ$, a unit matrix U is introduced to obtain H=$J^TJ+\mu U$, wherein u is a damping factor;

according to a formula $\omega(n+1)=\omega(n)-[J^TJ+\mu U]^{-1}J^Te$, a weight and a threshold of a LM algorithm are corrected; and when $\mu=0$, wherein the LM algorithm is degenerated into a Newton Method;

a weight update formula is denoted as:

$$\omega_{ij}^2(n+1) = \omega_{ij}^2(n) - \left[J^2(n)^T J^2(n) + \mu U\right]^{-1} \eta J^2(n)^T e_j(n) v_j^i(n)$$

$$\omega_{mi}^1(n+1) = \omega_{mi}^1(n) - \left[J^1(n)^T J^1(n) + \mu U\right]^{-1} \eta J^1(n)^T \sum_{j=1}^{J} \left(J^2(n)e_j(n)\right)$$

$$\omega_{ij}^2(n))v_i^j(n)v_M^m(n);$$

and a threshold update formula is denoted as:

$$b_j^2(n+1) = b_j^2(n) - \left[J^2(n)^T J^2(n) + \mu U\right]^{-1} \eta J^2(n)^T e_j(n) v_j^i(n).$$

$$b_i^1(n+1) = b_i^1(n) - \left[J^2(n)^T J^1(n) + \mu U\right]^{-1} \eta J^1(n)^T \sum_{j=1}^{J} \left(J^2(n)e_j(n)\right)$$

$$\omega_{ij}^2(n))v_i^j(n)v_M^m(n).$$

10. The neural network model optimization method based on the annealing process for the stainless steel ultra-thin strip according to claim 9, wherein a specific method for the performing the error calculation and the neural network testing in the step 9, comprises: calculating an error value, judging whether a MSE error formula meets a precision requirement, when the MSE error formula meets the precision requirement, stopping the iteration; when the MSE error formula does not meet the precision requirement, continuing the iteration; after finishing training of the neural network, testing the testing set; and obtaining an actual predicted value by inversely normalizing an output result of the network.

\*　\*　\*　\*　\*